US011865509B2

(12) United States Patent
Kogawa et al.

(10) Patent No.: US 11,865,509 B2
(45) Date of Patent: Jan. 9, 2024

(54) POROUS MOLDING

(71) Applicant: Asahi Kasei Kabushiki Kaisha, Tokyo (JP)

(72) Inventors: Masashi Kogawa, Tokyo (JP); Keitaro Suzumura, Tokyo (JP); Yutaka Koyama, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 808 days.

(21) Appl. No.: 16/959,783

(22) PCT Filed: Dec. 21, 2018

(86) PCT No.: PCT/JP2018/047335
§ 371 (c)(1),
(2) Date: Jul. 2, 2020

(87) PCT Pub. No.: WO2019/135371
PCT Pub. Date: Jul. 11, 2019

(65) Prior Publication Data
US 2020/0360915 A1    Nov. 19, 2020

(30) Foreign Application Priority Data

Jan. 4, 2018  (JP) ................. 2018-000142
Jan. 4, 2018  (JP) ................. 2018-000143
Jan. 4, 2018  (JP) ................. 2018-000148
Jan. 4, 2018  (JP) ................. 2018-000216
Jan. 4, 2018  (JP) ................. 2018-000223
Jan. 4, 2018  (JP) ................. 2018-000237

(51) Int. Cl.
| | |
|---|---|
| *B01J 20/26* | (2006.01) |
| *B05B 17/04* | (2006.01) |
| *C02F 1/28* | (2023.01) |
| *B01J 20/02* | (2006.01) |
| *B01J 47/018* | (2017.01) |
| *B01J 41/02* | (2006.01) |
| *C02F 1/42* | (2023.01) |
| *C01F 17/235* | (2020.01) |
| *C02F 101/10* | (2006.01) |

(52) U.S. Cl.
CPC ......... *B01J 20/0277* (2013.01); *B01J 41/02* (2013.01); *B01J 47/018* (2017.01); *C01F 17/235* (2020.01); *C02F 1/42* (2013.01); *C02F 2001/422* (2013.01); *C02F 2101/105* (2013.01)

(58) Field of Classification Search
CPC ............................................ C02F 1/28–1/285
See application file for complete search history.

(56) References Cited

U.S. PATENT DOCUMENTS

| | | | |
|---|---|---|---|
| 6,866,925 B1 | 3/2005 | Chane-Ching | |
| 7,407,587 B1 | 8/2008 | Moller | |
| 2007/0128424 A1 | 6/2007 | Omori et al. | |
| 2007/0166438 A1* | 7/2007 | Kitahata ............ B01J 20/2808 426/242 |
| 2010/0307978 A1 | 12/2010 | Sawyer et al. | |
| 2011/0280956 A1 | 11/2011 | Gore et al. | |
| 2012/0031827 A1 | 2/2012 | Burba et al. | |
| 2012/0219799 A1 | 8/2012 | Omori | |
| 2015/0283534 A1 | 10/2015 | Costantino et al. | |
| 2017/0240435 A1 | 8/2017 | Chen et al. | |
| 2018/0326141 A1 | 11/2018 | Han et al. | |
| 2018/0369781 A1 | 12/2018 | Omori | |

FOREIGN PATENT DOCUMENTS

| | | | | |
|---|---|---|---|---|
| CN | 101584981 A | 11/2009 | | |
| EP | 1695760 A1 * | 8/2006 | ............ | B01D 53/02 |
| JP | S55-028743 A | 2/1980 | | |
| JP | 2003-512992 A | 4/2003 | | |
| JP | 2005-118614 A | 5/2005 | | |
| JP | WO2005/075068 A1 | 8/2005 | | |
| JP | 2006-297382 A | 11/2006 | | |
| JP | 2007-014826 A | 1/2007 | | |
| JP | 2008-062184 A | 3/2008 | | |
| JP | 2009-214029 A | 9/2009 | | |
| JP | 2009-297707 A | 12/2009 | | |
| JP | 5679659 B2 * | 3/2015 | ............ | B01J 20/12 |
| JP | 2015-112518 A | 6/2015 | | |
| JP | 2017-056413 A | 3/2017 | | |
| JP | 2017-100050 A | 6/2017 | | |
| JP | 2017-104852 A | 6/2017 | | |
| JP | 2018-168156 A | 11/2018 | | |

(Continued)

OTHER PUBLICATIONS

Machine translation WO 2015152391-A1 (Year: 2023).*
Machine translation JP5679659 (Year: 2023).*
Supplementary European Search Report issued in corresponding European Patent Application No. 18898465.2 dated Jan. 27, 2021.
International Search Report issued in corresponding International Patent Application No. PCT/JP2018/047335 dated Apr. 2, 2019.
International Preliminary Report on Patentability and Written Opinion issued in corresponding International Patent Application No. PCT/JP2018/047335 dated Jul. 7, 2020.

*Primary Examiner* — Alexandre F Ferre
(74) *Attorney, Agent, or Firm* — Morgan, Lewis & Bockius LLP

(57) ABSTRACT

Provided is a porous molding which is capable of removing ions in water to be treated, in particular, phosphorus ions at a very high liquid-permeation rate of at least SV 120 $hr^{-1}$, and which has a large adsorption capacity. The porous molding according to the present invention comprises an organic polymer resin and an inorganic ion adsorbent, and is characterized in that a total volume of pores having a pore diameter of 1-80 nm as measured by a nitrogen adsorption method is 0.05-0.7 $cm^3/g$ per unit mass of the inorganic ion adsorbent.

19 Claims, No Drawings

(56) References Cited

FOREIGN PATENT DOCUMENTS

| WO | 2005/056175 | A1 | | 6/2005 | | |
|---|---|---|---|---|---|---|
| WO | 2011/062277 | A1 | | 11/2010 | | |
| WO | WO-2015152391 | A1 | * | 10/2015 | .............. | B01J 20/20 |
| WO | 2017/081857 | A1 | | 5/2017 | | |
| WO | 2017/082420 | A1 | | 5/2017 | | |
| WO | 2017/094478 | A1 | | 6/2017 | | |

* cited by examiner

POROUS MOLDING

FIELD

The present invention relates to a porous shaped body. More specifically, the present invention relates to a porous shaped body that contains an organic polymer resin and an inorganic ion adsorbent, is able to remove ions, especially phosphate ions, in water to be treated at an ultrahigh velocity, and has a large adsorption capacity.

BACKGROUND

In recent years, in view of the problem of eutrophication due to environmental pollution, environmental standards with respect to harmful substances such as phosphorus, boron, arsenic, and fluorine in drinking water, industrial water supply, industrial effluent, treated sewage water, and various environmental waters have been strengthened, and there has been an increasing demand for technologies for removing them. Furthermore, in recent years, there has been an increasing demand for a technology for removing them particularly in metal coating, pharmaceutical production, medical applications, and the like.

Phosphorus is one of the causative substances of eutrophication, and the relevant regulation is made more stringent in particular with respect to closed waters. In addition, since it is an element of which depletion is feared, there is a need for a technology for recovering from water effluent and reusing it. Further, since a renal disease patient having impaired renal function, such as a patient with chronic renal failure, is not able to excrete excessive phosphorus appropriately from the body, phosphorus gradually accumulates in the body to cause diseases such as hyperphosphatemia, there is a need for a technology for appropriately controlling the amount of phosphorus in the body by removing phosphorus in blood to prevent hyperphosphatemia.

In addition to the control of phosphorus in blood, control of the following elements is being studied.

Boron is an essential element for plant growth, but it is known that its excessive presence will adversely affect plant growth. Furthermore, it has been pointed out that when it is contained in drinking water, it may adversely affect health of the human body, and in particular, it may cause health disturbance such as decrease in reproductive function.

Arsenic is contained in water effluent of the non-ferrous metal refining industry, hot water effluent from a geothermal power plant, in the groundwater in specific areas, etc. The toxicity of arsenic has been known for a long time. It is accumulative in the living body, and is said to cause chronic poisoning, weight loss, sensory disorder, hepatic dysfunction, dermal deposition, skin cancer, etc.

Fluorine is frequently contained in water effluent from the metal refining industry, the glass industry, the electronic materials industry, etc. There is a concern about the effects of fluorine on the human body. It is known that excessive intake of fluorine will cause chronic fluorosis, such as mottled teeth, osteosclerosis, and thyroid disorder.

The amount of emissions of these various harmful substances has been increasing year by year, and a technology for removing these harmful substances efficiently is required. In addition to the conventional water effluent treatment field, a demand for selective removal of a specific ion, such as phosphorus and boron, from water used for metal coating, pharmaceutical production, etc. is growing.

As a technology for removing these various harmful substances, for example, one using an adsorbing material in which an inorganic ion adsorbent powder, such as hydrated zirconium ferrite, and hydrated cerium oxide, is supported on a polymer material has been known.

Also, it is known that a porous shaped body including an organic polymer resin and an inorganic ion adsorbent adsorbs phosphorus, boron, and the like.

As a method for producing such a porous shaped body, for example, the following PTL 1 discloses that a shaped body that has no skin layer on the surface, and is superior in surface aperture may be obtained by a method in which an inorganic ion adsorbent powder as an adsorption substrate is suspended in a polymer solution prepared by dissolving an organic polymer resin in an appropriate good solvent, and additionally dissolving a water-soluble polymer soluble in the good solvent and having an affinity for the organic polymer resin, followed by mixing, and shaping is performed in a poor solvent as a solidifying medium.

The following PTL 2 discloses that a porous shaped body having few secondary aggregates of inorganic ion adsorbents in the porous shaped body is superior in adsorption performance and strength.

Further, PTL 3 discloses that a porous shaped body including an organic polymer resin having a hydroxy group and an inorganic ion adsorbent powder has high resistance against a washing agent such as an oxidizing agent, and therefore is a porous shaped body suitable for an adsorbing material that can be used repeatedly.

An adsorbing material composed of the porous shaped body disclosed in PTL 1, 2, or 3 does not have a thin film called a skin layer on the surface of the porous shaped body, and has high porosity also inside the adsorbing material. Therefore, it is characterized in that the diffusion velocity of an adsorption target substance, such as phosphorus and boron, into an adsorbing material is high. For PTLs 1 to 3, it is disclosed that the adsorption treatment is performed at a flow rate (SV) of 30 hr$^{-1}$.

Meanwhile, in recent years, in particular for use in metal coating, pharmaceutical production, a medical device, etc., a treatment at an ultrahigh velocity such as SV 120 hr$^{-1}$ or SV 240 hr$^{-1}$, which is much higher than the conventional flow rate of SV 30 hr$^{-1}$ is required. While the following PTL 4 discloses that an ultrahigh velocity treatment is performed by increasing the diffusion velocity of an adsorption target substance, such as phosphorus, and boron, into a porous shaped body by regulating the modal pore diameter measured with a mercury porosimeter.

Further, the following PTL 5 discloses a phosphorus adsorption column, in which porous fibers internally supporting particulates of a carbonate of a rare earth element or an oxide of a Group 4, with an average particle diameter of larger than 100 nm but not larger than 100 µm or less, are contained.

However, since it is required to further increase the adsorption capacity under the condition of an ultrahigh velocity treatment such as SV 120 hr$^{-1}$, the conventional porous shaped body, or porous fibers disclosed in PTLs 1 to 5 are desired to be further improved.

CITATION LIST

Patent Literature

[PTL 1] International Publication No. WO 2005/056175
[PTL 2] Japanese Unexamined Patent Publication (Kokai) No. 2009-297707
[PTL 3] International Publication No. WO 2011/062277
[PTL 4] International Publication No. WO 2017/082420
[PTL 5] International Publication No. WO 2017/094478

SUMMARY

Technical Problem

In view of the aforedescribed conventional art, an object of the present invention is to provide a porous shaped body that can remove ions, particularly phosphate ions, in water to be treated even at an ultrahigh flow rate of SV 120 hr$^{-1}$, or SV 240 hr$^{-1}$, and has a large adsorption capacity.

Solution to Problem

The present inventors have conducted intensive studies and experiments in order to achieve the object to find that an porous shaped body, in which an organic polymer resin and an inorganic ion adsorbent are included, and the volumes of pores having a pore diameter of from 1 nm to 80 nm measured by a nitrogen gas adsorption method is per unit mass of the inorganic ion adsorbent from 0.05 to 0.7 cm$^3$/g, can achieve the object, thereby completing the present invention.

In other words, the present invention is as follows.

A porous shaped body in which an organic polymer resin and an inorganic ion adsorbent are included, and the sum total of the volumes of pores having a pore diameter of from 1 nm to 80 nm measured by a nitrogen gas adsorption method is per unit mass of the inorganic ion adsorbent from 0.05 cm$^3$/g to 0.7 cm$^3$/g.

The porous shaped body according to [1] above, wherein the sum total of the volumes of pores having a pore diameter of from 1 nm to 80 nm measured by a nitrogen gas adsorption method is per unit mass of the porous shaped body from 0.02 cm$^3$/g to 0.6 cm$^3$/g.

The porous shaped body according to [1] or [2] above, wherein the specific surface area measured by a nitrogen gas adsorption method is from 50 m$^2$/g to 400 m$^2$/g.

The porous shaped body according to any one of [1] to [3] above, wherein the supported amount of the inorganic ion adsorbent included in the porous shaped body is from 30% by mass to 95% by mass.

The porous shaped body according to any one of [1] to [4] above in a form of spherical particles with an average particle diameter of from 100 μm to 2500 μm.

The porous shaped body according to any one of [1] to [5] above, wherein the flatness ratio of the porous shaped body particles is from 0 to 0.3.

The porous shaped body according to any one of [1] to [6] above, wherein the bulk density of the porous shaped body is from 0.2 g/mL to 0.7 g/mL.

The porous shaped body according to any one of [1] to [7] above, wherein the average particle diameter of an inorganic ion adsorbent included in the porous shaped body is from 0.08 μm to 10 μm, and the ratio of (maximum particle diameter)/(minimum particle diameter) of the inorganic ion adsorbent is from 1 to 500.

The porous shaped body according to any one of [1] to [8] above, wherein the pore volume measured by a mercury intrusion method in a range of pore diameter of from 5.5 nm to 120 μm is from 0.6 to 2.0 cm$^3$/g.

The porous shaped body according to any one of [1] to [9] above, wherein the modal pore diameter measured by a mercury intrusion method is from 0.08 μm to 0.7 μm.

The porous shaped body according to any one of [1] to [10] above, wherein the elastic modulus of the porous shaped body is from 1000 mN/m$^2$ to 12000 mN/m$^2$.

The porous shaped body according to any one of [1] to [11] above, wherein the anion concentration in an aqueous solution prepared by immersing the porous shaped body in pure water in an amount 10 times the bulk volume of the same at 70° C. for 1 hour is less than 2.0 mg/L.

The porous shaped body according to any one of [1] to [12] above, wherein the value of absorbance in a UV measurement of an aqueous solution prepared by immersing the porous shaped body in pure water in an amount 10 times the bulk volume of the same at 70° C. for 1 hour is less than 0.2.

The porous shaped body according to any one of [1] to [13] above, wherein the metal ion concentration in an aqueous solution prepared by immersing the porous shaped body in pure water in an amount 10 times the bulk volume of the same at 70° C. for 1 hour is less than 1.0 mg/L.

The porous shaped body according to any one of [1] to [14] above, wherein the pH of an aqueous solution prepared by immersing the porous shaped body in pure water in an amount 10 times the bulk volume of the same at 70° C. for 1 hour is 5 or more, and the amount of change in pH is from 0 to 1.5.

The porous shaped body according to any one of [1] to [15] above, wherein the abrasion rate of the porous shaped body is from 0% to 0.1%.

The porous shaped body according to any one of [1] to [16] above, wherein the inorganic ion adsorbent comprises at least one metal oxide represented by the following Formula (I):

$$MN_xO_n \cdot mH_2O \tag{I}$$

[wherein x is 0 to 3, n is 1 to 4, m is 0 to 6, and M and N are metal elements that are different from each other, and selected from the group consisting of Ti, Zr, Sn, Sc, Y, La, Ce, Pr, Nd, Sm, Eu, Gd, Tb, Dy, Ho, Er, Tm, Yb, Lu, Al, Si, Cr, Co, Ga, Fe, Mn, Ni, V, Ge, Nb, and Ta]; and/or at least one metal carbonate represented by the following Formula (III):

$$Q_yR_z(CO_3)_s \cdot tH_2O \tag{III}$$

[wherein y is 1 to 2, z is 0 to 1, s is 1 to 3, t is 0 to 8, and Q and R are metal elements that are different from each other, and selected from the group consisting of Mg, Ca , Sr, Ba, Sc, Mn, Fe, Co, Ni, Ag, Zn, Y, La, Ce, Pr, Nd, Sm, Eu, Gd, Tb, Dy, Ho, Er, Tm, Yb, and Lu].

The porous shaped body according to [17] above, wherein the metal oxide is selected from the following groups (a) to (c):

(a) hydrated titanium oxide, hydrated zirconium oxide, hydrated tin oxide, hydrated cerium oxide, hydrated lanthanum oxide, and hydrated yttrium oxide;

(b) a composite metal oxide between at least one metal element selected from the group consisting of titanium, zirconium, tin, cerium, lanthanum, and yttrium, and at least one metal element selected from the group consisting of aluminum, silicon, and iron; and (c) activated alumina.

The porous shaped body according to [17] above, wherein the metal carbonate is selected from the following group (d):

(d) magnesium carbonate, calcium carbonate, strontium carbonate, barium carbonate, scandium carbonate, manganese carbonate, iron carbonate, cobalt carbonate, nickel carbonate, silver carbonate, zinc carbonate, yttrium carbonate, lanthanum carbonate, cerium carbonate, praseodymium carbonate, neodymium carbonate, samarium carbonate, europium carbonate, gadolinium carbonate, terbium carbonate, dysprosium carbonate, holmium carbonate, erbium carbonate, thulium carbonate, ytterbium carbonate, and lutetium carbonate.

The porous shaped body according to any one of [1] to [19] above, wherein the organic polymer resin is at least one selected from the group consisting of an ethylene/vinyl alcohol copolymer (EVOH), polyacrylonitrile (PAN), polysulfone (PS), polyethersulfone (PES), poly(vinylidene fluoride) (PVDF), poly(methyl methacrylate) (PMMA), poly (aryl ether sulfone), polypropylene, polystyrene, polycarbonate, cellulose, and cellulose triacetate.

A column filled with the porous shaped bodies according to any one of [1] to [20] above.

A method for cleaning a porous shaped body and/or filling with a liquid comprising a step of filling the column according to [21] above with the porous shaped bodies according to any one of [1] to [20] above, and feeding a cleaning liquid and/or a filling liquid such that the cleaning liquid and/or the filling liquid flows by an upward flow from the bottom of the column, the cleaning liquid and/or the filling liquid flows by a downward flow from the top of the column, or the cleaning liquid and/or the filling liquid flows by both of them.

The method according to [22] above, wherein the cleaning liquid and/or the filling liquid flows at a flow rate of from SV 1 hr$^{-1}$ to SV 300 hr$^{-1}$.

The method according to [22] or [23] above, wherein the cleaning liquid and/or the filling liquid is fed in an amount 1 times to 10,000 times the bulk volume of the porous shaped body.

Advantageous Effects of Invention

Since a porous shaped body according to the present invention can remove ions, particularly phosphate ions, in water to be treated even at an ultrahigh flow rate of SV 120 hr$^{-1}$, or SV 240 hr$^{-1}$, and has a large adsorption capacity, it is particularly suitable for removing a harmful substance in metal coating, pharmaceutical production, medical use, etc.

DESCRIPTION OF EMBODIMENTS

Embodiments for implementing the present invention (hereinafter, referred to as this embodiment) will be described below in detail, provided that the present invention is not limited to the following embodiments, and can be implemented with various modifications within the scope of the invention.

[Porous Shaped Body]

A porous shaped body of this embodiment is a porous shaped body including an organic polymer resin and an inorganic ion adsorbent, and is characterized in that the sum total of the volumes of pores having a pore diameter of from 1 nm to 80 nm measured by a nitrogen gas adsorption method is per unit mass of the inorganic ion adsorbent from 0.05 cm$^3$/g to 0.7 cm$^3$/g.

In this embodiment, the sum total of the volumes of pores having a pore diameter of from 1 nm to 80 nm measured by a nitrogen gas adsorption method is per unit mass of the inorganic ion adsorbent supported on the porous shaped body from 0.05 cm$^3$/g to 0.7 cm$^3$/g, preferably from 0.1 cm$^3$/g to 0.6 cm$^3$/g, and more preferably from 0.2 cm$^3$/g to 0.5 cm$^3$/g. A sum total of pore volumes is calculated by the BJH method based on the measurement of a freeze-dried porous shaped body by a nitrogen gas adsorption method.

The sum total Va of pore volume per unit mass of the inorganic ion adsorbent may be found by the following Formula:

$$Va = Vb/Sa \times 100$$

wherein Vb (cm$^3$/g) represents the pore volume per unit mass of the porous shaped body calculated from a dried porous shaped body, and Sa (% by mass) represents the supported amount of the inorganic ion adsorbent on the porous shaped body.

The supported amount Sa (% by mass) of the inorganic ion adsorbent on a porous shaped body may be found by the following Formula:

$$Sa = Wb/Wa \times 100$$

wherein Wa (g) represents the mass of a porous shaped body in a dry state, and Wb (g) represents the mass of ashes.

In this regard, the term ashes mean a residue obtained when a porous shaped body is fired at 800° C. for 2 hours.

The pore volume of pores having a diameter of from 1 nm to 80 nm measured by a nitrogen gas adsorption method is a value which reflects mainly the pore volume of the inorganic ion adsorbent contained in a porous shaped body. As the pore volume of pores having a diameter of from 1 nm to 80 nm measured by a nitrogen gas adsorption method becomes larger, the diffusion efficiency of ions into the inorganic ion adsorbent becomes higher, and the adsorption capacity becomes higher.

When the sum total of pore volumes per unit mass of the inorganic ion adsorbent is smaller than 0.05 cm$^3$/g, the pore volume of the inorganic ion adsorbent is so small that an adsorption target substance hardly diffuses into the inorganic ion adsorbent, and the adsorption capacity is lowered drastically. Meanwhile, when this value is larger than 0.7 cm$^3$/g, the bulk density of the inorganic ion adsorbent is so low that the viscosity of the stock liquid slurry is apt to increase, and granulation becomes difficult.

In this embodiment, the sum total of the volumes of pores having a pore diameter of from 1 nm to 80 nm measured by a nitrogen gas adsorption method is per unit mass of the porous shaped body from 0.02 cm$^3$/g to 0.6 cm$^3$/g, preferably from 0.08 cm$^3$/g to 0.55 cm$^3$/g, and more preferably from 0.12 cm$^3$/g to 0.5 cm$^3$/g.

Meanwhile, as described below, the supported amount of the inorganic ion adsorbent contained in the porous shaped body is preferably from 30% by mass to 95% by mass, more preferably from 40% by mass to 90% by mass, and further preferably from 50% by mass to 80% by mass.

A pore volume is calculated by the BJH method based on the measurement of a freeze-dried porous shaped body by a nitrogen gas adsorption method.

When this value is less than 0.02 cm$^3$/g, the adsorption target substance hardly diffuses into the porous shaped body, and the adsorption capacity is reduced. Meanwhile, when the value is larger than 0.6 cm$^3$/g, the viscosity of a stock liquid slurry is apt to increase, and granulation becomes difficult.

In this embodiment, the specific surface area of a porous shaped body measured by a nitrogen gas adsorption method is preferably from 50 m$^2$/g to 400 m$^2$/g, more preferably from 70 m$^2$/g to 350 m$^2$/g, and further preferably from 100 m$^2$/g to 300 m$^2$/g.

A specific surface area is calculated by the BET method based on the measurement of a freeze-dried porous shaped body by a nitrogen gas adsorption method.

Since the specific surface area of a porous shaped body measured by a nitrogen gas adsorption method is a value which reflects mainly the specific surface area of the inorganic ion adsorbent contained in the porous shaped body, as the value becomes larger, the number of ion adsorption sites becomes higher and the adsorption capacity becomes higher.

When the specific surface area of a porous shaped body is less than 50 $m^2/g$, the number of adsorption sites on the inorganic ion adsorbent is so small, and the adsorption capacity is significantly reduced. Meanwhile, when this value is larger than 400 $m^2/g$, the bulk density of the inorganic ion adsorbent is low, the viscosity of a stock liquid slurry is apt to increase, and granulation becomes difficult.

In this embodiment, the supported amount of the inorganic ion adsorbent contained in a porous shaped body is preferably from 30% by mass to 95% by mass, more preferably from 40% by mass to 90% by mass, and further preferably from 50% by mass to 80% by mass. The supported amount Sa of the inorganic ion adsorbent is measured as described above.

When the supported amount is less than 30% by mass, the contact frequency between an ion as the adsorption target substance and an inorganic ion adsorbent as an adsorption substrate is apt to be insufficient, and sufficient adsorption performance can be hardly obtained. Meanwhile, when it exceeds 95% by mass, the strength of the porous shaped body tends to be insufficient.

Conventionally, generally when a porous shaped body is used in an application of pharmaceutical production, a medical device, or the like, for example, in an application in which whole blood is fed to flow at an ultrahigh velocity, there is a risk that a blood component blocks a flow path in the gaps between the porous shaped bodies, and the pressure rises. Further it has been known that, generally when a porous shaped body is used for pharmaceutical production, a medical device, or the like, an impurity anion or metal ion mixed in at the time of production, or an impurity anion or metal ion dissolved out from an inorganic ion adsorbent itself may cause a trouble. For example, when hydrated cerium oxide is used as an inorganic ion adsorbent, chlorine has been adsorbed on the surface of hydrated cerium oxide synthesized from a chloride, and therefore, there is a concern that chloride ions may be dissolved out into treated water. Also, when the impurity anion stuck to hydrated cerium oxide is liberated into treated water, the pH of the treated water is lowered in consequence, and there arises a concern that the hydrated cerium oxide itself may leach out. Further, in an application of pharmaceutical production, a medical device, or the like, it is required that impurities should not be mixed into the treated liquid by reason of so-called powder shedding in which an inorganic ion adsorbent, or an organic polymer resin supported on a porous shaped body falls off, or so-called wear in which an inorganic ion adsorbent, or an organic polymer resin is abraded by frictions of porous shaped bodies with each other.

Therefore, in order to prevent such a problem, when a porous shaped body of this embodiment is used for pharmaceutical production, a medical device, or the like, it is preferably in a mode described below so that the pressure rise does not occur even when the liquid is fed to flow at an ultrahigh velocity, an impurity anion mixed in at the time of production, or a metal ion leached out from an inorganic ion adsorbent is suppressed, and powder shedding, or wear does not occur.

A porous shaped body of this embodiment preferably has an average particle diameter of from 100 μm to 2500 μm, and is substantially in a form of spherical particles. The average particle diameter is more preferably from 150 μm to 2000 μm, further preferably from 200 μm to 1500 μm, and still further preferably from 300 μm to 1000 μm.

A porous shaped body of this embodiment is preferably in a form of spherical particles, and such spherical particles may be not only true-spherical but also ellipsoidal.

In this embodiment, an average particle diameter means the median diameter of equivalent spherical diameters obtained from the angular distribution of scattered laser light intensities, assuming that a porous shaped body is spherical.

When the average particle diameter is 100 μm or more, the pressure loss due to porous shaped bodies filling a column or a tank is small, and therefore the diameter is suitable for a water feeding treatment at an ultrahigh velocity. In particular, when the average particle diameter is 300 μm or more, the flow path in the gaps between the particles becomes wide, and, for example, even when whole blood is fed to flow in a medical application, etc., the pressure is unlikely to increase, so that it can be used favorably. Meanwhile, when the average particle diameter is 2500 μm or less, and a column or a tank is packed therewith, the surface area where a porous shaped body and a treated liquid are in contact can be large, and ions can be surely adsorbed even when the liquid is fed to flow at an ultrahigh velocity.

A porous shaped body of this embodiment is in a form of spherical particle, and the flatness ratio is from 0 to 0.3, preferably from 0 to 0.25, and more preferably from 0 to 0.2.

In this embodiment, the flatness ratio means the average value of 10 measurement values expressed by Flatness ratio $(f)=(a-b)/a$, wherein "a" represents the major axis and "b" represents the minor axis of a porous shaped body, when the porous shaped body in a wet state is photographed under a microscope.

In a case where the flatness ratio is 0.3 or less, the pressure loss can be small when a column or a tank is packed with porous shaped bodies, and therefore they are suitable for an ultrahigh water flow rate treatment. Furthermore, in the case where the flatness ratio is 0.3 or less, the flow path in the gaps between the particles becomes wide, and the pressure loss can be small when a liquid to be treated is fed. Furthermore, since the contact area between the porous shaped bodies is small, and there is lack of sharply shaped portion that is typical of a high flatness ratio, and is apt to be damaged, the abrasion rate of the porous shaped bodies can be reduced.

In this embodiment, the bulk density of a porous shaped body is preferably from 0.2 g/mL to 0.7 g/mL, more preferably from 0.25 g/mL to 0.65 g/mL, and further preferably from 0.3 g/mL to 0.6 g/mL.

The bulk density of a porous shaped body is measured by the following method. When a porous shaped body is in a particulate, cylindrical, or hollow cylindrical form or the like, and has a short shape, its bulk volume is measured by placing porous shaped bodies in a wet state in a graduated cylinder or the like regarding 1 mL as 1 $cm^3$. When a porous shaped body is in a filamentous, hollow filamentous, or sheet-like form or the like, and has a long shape, the cross-sectional area and the length thereof in a wet state are measured and the bulk volume is calculated as the product of the two. Then after freeze-drying the weight is measured and the bulk density is calculated as weight/bulk volume.

When a porous shaped body is in a filamentous, hollow filamentous, or sheet-like form or the like, and has a long shape, the cross-sectional area and the length thereof in a wet state are measured and the volume is calculated as the product of the two. Then after freeze-drying the weight is measured and the bulk density is calculated as weight/bulk volume. When the value of the bulk density is less than 0.2 g/mL, the strength is insufficient, and a porous shaped body is liable to deform at the time of transportation or handling. Meanwhile, when the value is more than 0.7 g/mL, the impact when porous formed bodies collide with each other becomes high, and the powder shedding or wear is likely to occur.

In this embodiment, the average particle diameter of an inorganic ion adsorbent is from 0.08 μm to 10 μm, preferably from 0.08 μm to 5 μm, and further preferably from 0.08 μm to 2 μm. When the average particle diameter of an inorganic ion adsorbent is 0.08 μm or more, the viscosity of a raw material slurry containing an inorganic ion adsorbent, which is a raw material of a porous shaped body, an organic polymer resin, and a good solvent for an organic polymer resin can be regulated within an appropriate range, and shaping is facilitated. When there is an inorganic ion adsorbent smaller than 0.08 μm, the surface area becomes large, and the good solvent for an organic polymer resin is captured on the surface of an inorganic ion adsorbent. As a result, the amount of the good solvent required for dissolving an organic polymer resin is reduced, and the viscosity of the raw material slurry is increased which may make shaping difficult. However, when the average particle diameter of an inorganic ion adsorbent is 0.08 μm or more, regulation of the viscosity of a stock liquid slurry within an appropriate range for shaping becomes easy. When the average particle diameter of an inorganic ion adsorbent is 10 μm or less, the surface area of an inorganic ion adsorbent can be increased, and ions can be surely adsorbed even when the liquid is fed to flow at an ultrahigh velocity.

In this embodiment, the ratio of (maximum particle diameter)/(minimum particle diameter) of an inorganic ion adsorbent is from 1 to 500, preferably from 1 to 300, and more preferably from 1 to 200. When the ratio of (maximum particle diameter)/(minimum particle diameter) of an inorganic ion adsorbent is 500 or less, the viscosity of a raw material slurry containing an inorganic ion adsorbent, which is a raw material of a porous shaped body, an organic polymer resin, and a good solvent for an organic polymer resin can be regulated within an appropriate range, and shaping is facilitated.

In this embodiment, the average particle diameter of an inorganic ion adsorbent in a porous shaped body can be measured by the following method.

An organic polymer resin is completely dissolved in a good solvent for an organic polymer resin in an amount 10 times the bulk volume of a porous shaped body by immersion therein with heating at 60° C. and reciprocating shaking at a velocity of 150 rpm for 24 hours. Next, a suspension of an inorganic ion adsorbent is filtrated with a filter having a pore diameter of 0.1 μm, which is resistant to the good solvent for an organic polymer resin. And the filtrand inorganic ion adsorbent is immersed in the good solvent in an amount 10 times the bulk volume of the porous shaped body with heating at 60° C. and reciprocating shaking at a velocity of 150 rpm for 24 hours. As a filter resistant to the good solvent for an organic polymer resin, for example, a PTFE filter or the like may be used. The aforedescribed operation is repeated three times, so as to remove thoroughly the dissolved organic polymer resin. Then, the inorganic ion adsorbent collected by the filtration operation is immersed in water in an amount 10 times the bulk volume of the porous shaped body with heating at 60° C. and reciprocating shaking at a velocity of 150 rpm for 24 hours so as to replace the good solvent contained in the inorganic ion adsorbent with water. Thereafter, the suspension of the inorganic ion adsorbent is filtrated with a filter having a pore diameter of 0.1 μm, which is resistant to the good solvent for an organic polymer resin. The aforedescribed operation is repeated two times, and the inorganic ion adsorbent collected by the filtration operation is measured directly in a wet state with a laser diffraction/scattering particle size analyzer. At this time, the sample is irradiated with ultrasonic waves before the measurement for 5 min. For example, when hydrated cerium oxide is used as an inorganic ion adsorbent, its sample is measured using the value of cerium oxide as the refractive index. Similarly, when hydrated zirconium oxide is used as an inorganic ion adsorbent, its sample is measured using the value of zirconium oxide as the refractive index. The value of the median diameter (d50) obtained by the above operation is defined as the average particle diameter.

Similarly, the ratio of (maximum particle diameter)/(minimum particle diameter) is calculated by dividing the value of the maximum particle diameter by the value of the minimum particle diameter obtained by the above measurement operation.

In this embodiment, the pore volume measured by a mercury intrusion method in a range of pore diameter of from 5.5 nm to 120 μm is from 0.6 to 2.0 cm$^3$/g, preferably from 0.8 to 1.8 μm, and more preferably from 1.0 to 1.6 μm. The pore volume is obtained by measuring a freeze-dried porous shaped body using a mercury porosimeter. A mercury porosimeter is a device that analyzes the size of pores in a porous material using a mercury intrusion method, and is suitable for a measurement of a relatively large pore distribution (mesopore (several nanometers) to macropore (several hundred micrometers)), which cannot be measured by a gas adsorption method (BET method). When the value of the pore volume measured by the mercury intrusion method is 0.6 cm$^3$/g or more, an adsorption target substance easily diffuses into the porous shaped body, and a high adsorption amount can be achieved even when a treatment with an ultrahigh velocity liquid feed is performed. Meanwhile, when the pore volume is larger than 2.0 cm$^3$/g, the strength of a porous shaped body is insufficient.

In this embodiment, the modal pore diameter of a porous shaped body measured by a mercury intrusion method is from 0.08 to 0.7 μm, preferably from 0.1 to 0.6 μm, and more preferably from 0.2 to 0.5 μm.

The modal pore diameter is obtained by measuring a freeze-dried porous shaped body by a mercury intrusion method.

In this embodiment, a modal pore diameter is based on volume and defined as a pore diameter at which the value of logarithmic differential pore volume (dV/d(logD), where V stands for a mercury intrusion volume, and D for a pore diameter) is maximum in a graph made by plotting a logarithmic differential pore volume vs a pore diameter measured with a mercury porosimeter.

In this embodiment, by measuring the modal pore diameter with a mercury porosimeter, the characteristics of the porous structure (skeleton structure) constituted with an organic polymer resin in a porous shaped body can be analyzed in detail.

When the modal pore diameter is 0.08 μm or more, it is large enough as the pore diameter of the interconnecting pore for an adsorption target substance to diffuse into the porous shaped body, and a high diffusion velocity can be attained. Meanwhile, when the modal pore diameter is 0.70 μm or less, the gaps between porous shaped bodies become small, and the content occupied by the inorganic ion adsorbent in unit volume become high. Consequently, a large amount can be adsorbed even when a treatment at an ultrahigh velocity liquid feed is performed.

In this embodiment, the elastic modulus of a porous shaped body is from 1000 mN/m² to 12000 mN/m², preferably from 2000 mN/m² to 11000 mN/m², and more preferably from 3000 mN/m² to 10000 mN/m².

The elastic modulus of a porous shaped body is determined as the average value of five measurements on a porous shaped body in a wet state using a compression-type measuring instrument.

When the elastic modulus is less than 1000 mN/m², the strength is insufficient, and the porous shaped body is easily deformed at the time of transportation or handling. In order to shape a porous shaped body having an elastic modulus of more than 12000 mN/m², it is necessary to increase the concentrations of the inorganic ion exchanger and/or the polymer in a stock liquid slurry, which causes viscosity increase of the stock liquid slurry, and it becomes difficult to shape the porous shaped body.

This embodiment is characterized in that the anion concentration in an aqueous solution prepared by immersing the porous shaped body in pure water in an amount 10 times the bulk volume of the same at 70° C. for 1 hour is less than 2.0 mg/L.

In this embodiment, the amount of the anions having leached out from a porous shaped body means the sum total of anion concentrations measured by ion chromatography with respect to a solution (immersion solution) prepared by immersing the porous shaped body in water in an amount 10 times the bulk volume of the same at 70° C. for 1 hour. Examples of the anion species include formate, acetate, oxalate, succinate, nitrate, and nitrite. The anion concentration is preferably less than 2.0 mg/L, and more preferably less than 1.0 mg/L. When the anion concentration is less than 2.0 mg/L, not only there is little contamination of the treated liquid with impurity anions, but also lowering of the pH of the treated liquid due to anion desorption may be suppressed so that leaching out of a metal oxide or a metal carbonate, which are components of a porous shaped body, can be suppressed.

In this embodiment, the value of absorbance in a UV measurement of an aqueous solution prepared by immersing the porous shaped body in pure water in an amount 10 times the bulk volume of the same at 70° C. for 1 hour is preferably less than 0.2, more preferably less than 0.1, and further preferably less than 0.05.

In this embodiment, the value of absorbance in a UV measurement means the maximum absorbance, when an aqueous solution (immersion solution) prepared by immersing the porous shaped body in water in an amount 10 times the bulk volume of the same at 70° C. for 1 hour is placed in a quartz glass cell having an optical path length of 1 cm, and measured in a wavelength range of 200 nm to 350 nm.

Since the absorbance increases due to the presence of an inorganic anion or an organic substance in the immersion solution, when the value of absorbance is less than 0.2, leaching out of an impurity ion or an impurity organic substance into a treated liquid may be reduced.

In this embodiment, the metal ion concentration in an aqueous solution prepared by immersing the porous shaped body in pure water in an amount 10 times the bulk volume of the same at 70° C. for 1 hour is preferably less than 1.0 mg/L, more preferably less than 0.5 mg/L, and further preferably less than 0.1 mg/L.

In this embodiment, the amount of metal ions having leached out from a porous shaped body means the sum total of the metal ion concentrations in a solution (immersion solution) prepared by immersing the porous shaped body in water in an amount 10 times the bulk volume of the same at 70° C. for 1 hour measured with an ICP-MS apparatus.

When the metal ion concentration in the immersion solution is less than 1.0 mg/L, leaching out of a metal ion into the treated liquid may be suppressed.

In this embodiment, the pH of an aqueous solution prepared by immersing the porous shaped body in pure water in an amount 10 times the bulk volume of the same at 70° C. for 1 hour is 5 or more, and the amount of change in pH is preferably from 0 to 1.5, more preferably from 0 to 1.0, and further preferably from 0 to 0.5.

In this embodiment, the pH means a value measured by a pH meter with respect to a solution (immersion solution) prepared by immersing the porous shaped body in pure water in an amount 10 times the bulk volume of the same at 70° C. for 1 hour.

Meanwhile, the amount of change in pH means the absolute value of the difference between the above measured value and the value obtained by a measurement by a pH meter with respect to the liquid prepared by heating the same amount of pure water at 70° C. for 1 hour.

When the pH of the immersion solution is 5 or more, leaching out of a metal oxide and a metal carbonate, which are components of a porous shaped body, can be suppressed.

When the pH change of the immersion solution is 1.5 or less, the pH change of the treated liquid becomes small, and the porous shaped body may be used in an application such as a medical device in which the pH change of a treated liquid may raise concern.

The abrasion rate of a porous shaped body of this embodiment is from 0% to 0.1%. When the abrasion rate is 0.1% or less, so-called powder shedding in which an inorganic ion adsorbent falls off from a porous shaped body, or wear by frictions of porous shaped bodies with each other is limited, and leaching out of impurities from a porous shaped body can be suppressed. Further, it is possible to prevent decrease in the amount of adsorption due to wear of a porous shaped body.

[Inorganic Ion Adsorbent]

An inorganic ion adsorbent constituting a porous shaped body of this embodiment means an inorganic substance exhibiting an ion adsorption phenomenon or an ion exchange phenomenon.

Examples of a natural inorganic ion adsorbent include various mineral substances such as zeolite, and montmorillonite.

Specific examples of various mineral substances include a kaolin mineral which is aluminosilicate having a single-layer lattice, white mica having a two-layer lattice structure, glauconite, Kanuma soil, pyrophyllite, talc, feldspar having a three-dimensional framework, zeolite, and montmorillonite.

Examples of a synthetic inorganic ion adsorbent include a metal oxide, a salt of a polyvalent metal, an insoluble hydrated oxide, and a metal carbonate. The metal oxide may include a composite metal oxide, a composite metal hydroxide, and a hydrated oxide of a metal.

An inorganic ion adsorbent may contain, from the viewpoint of the adsorption performance with respect to an adsorption target substance, and leaching out characteristics, at least one metal oxide represented by the following Formula (I):

$$MN_xO_n \cdot mH_2O \qquad (I)$$

[wherein x is 0 to 3, n is 1 to 4, m is 0 to 6, and M and N are metal elements that are different from each other, and selected from the group consisting of Ti, Zr, Sn, Sc, Y, La, Ce, Pr, Nd, Sm, Eu, Gd, Tb, Dy, Ho, Er, Tm, Yb, Lu, Al, Si, Cr, Co, Ga, Fe, Mn, Ni, V, Ge, Nb, and Ta].

A metal oxide may be a non-hydrous (unhydrated) metal oxide, for which "m" in the above Formula (I) is 0, or may be a hydrous metal oxide (hydrated metal oxide), for which "m" is a number other than 0.

The "x, n, and m" in the above Formula (I) are not required to be an integer. For example, iron oxyhydroxide (FeOOH) can be expressed by x=0, n=1.5, m=0.5.

A metal oxide, for which "x" in the above Formula (I) is a number other than 0, is a composite metal oxide which is expressed by a chemical formula having a fixed composition ratio of the respective elements contained in the metal oxide, and in which the contained metal elements are uniformly distributed over the entire oxide with regularity.

Specific examples thereof include nickel ferrite ($NiFe_2O_4$), and hydrated ferrite of zirconium ($Zr \cdot Fe_2O_4 \cdot mH_2O$, where m is 0.5 to 6), having formed a perovskite structure, a spinel structure, or the like.

An inorganic ion adsorbent may contain plural kinds of metal oxides represented by the above Formula (I).

As an inorganic ion adsorbent, from the viewpoint of excellent adsorption performance with respect to phosphorus, boron, fluorine and/or arsenic, the metal oxide is preferably selected from the following groups of (a) to (c):

(a) hydrated titanium oxide, hydrated zirconium oxide, hydrated tin oxide, hydrated cerium oxide, hydrated lanthanum oxide, and hydrated yttrium oxide;
(b) a composite metal oxide of at least one metal element selected from the group consisting of titanium, zirconium, tin, cerium, lanthanum, and yttrium, and at least one metal element selected from the group consisting of aluminum, silicon, and iron; and
(c) activated alumina.

As the metal oxide, a material selected from any one of the groups (a) to (c) may be used; a combination of materials selected from any one of the groups (a) to (c) may be used; or a combination of materials of each of the groups (a) to (c) may be used. When a combination is used, a mixture of two or more materials selected from any one of the groups (a) to (c) may be used, or a mixture of two or more materials selected from two or more groups of (a) to (c) may be used.

An inorganic ion adsorbent may contain aluminum sulfate-impregnated activated alumina from the viewpoint of low cost and high adsorbability.

As an inorganic ion adsorbent, those containing a metal element other than M and N in a state of solid solution in addition to the metal oxide represented by the above Formula (I), are more preferable from the viewpoint of inorganic ion adsorbing property, and production cost.

Examples thereof include hydrated zirconium oxide represented by $ZrO_2 \cdot mH_2O$ (m is a number other than 0), in which iron is contained in a state of solid solution.

Examples of a salt of a polyvalent metal include a hydrotalcite-type compound represented by the following Formula (II):

[wherein $M^{2+}$ is at least one kind of divalent metal ion selected from the group consisting of $Mg^{2+}$, $Ni^{2+}$, $Fe^{2+}$, $Ca^{2+}$, and $Cu^{2+}$; and $M^{3+}$ is at least one kind of trivalent metal ion selected from the group consisting of $Al^{3+}$, and $Fe^{3+}$; $A^{n-}$ is an n-valent anion; as well as $0.1 \leq p \leq 0.5$; $0.1 \leq q \leq 0.5$; and r is 1 or 2].

A hydrotalcite-typed compound represented by the above Formula (II) is preferable as an inorganic ion adsorbent, because a raw material is inexpensive and the adsorption power is high.

Examples of an insoluble hydrated oxide include an insoluble heteropolyacid salt, and insoluble hexacyanoferrate.

A metal carbonate exhibits excellent performance as an inorganic ion adsorbent from the viewpoint of adsorption performance, however from the viewpoint of leaching out, scrutiny into its application is necessary in using a carbonate.

From the viewpoint that an ion exchange reaction with carbonate ions can be expected, a metal carbonate may contain at least one kind of metal carbonate represented by the following Formula (III):

$$Q_y R_z (CO_3)_s \cdot tH_2O \qquad (III)$$

[wherein y is 1 to 2; z is 0 to 1; s is 1 to 3; t is 0 to 8; and Q and R are metal elements that are different from each other, and selected from the group consisting of Mg, Ca , Sr, Ba, Sc, Mn, Fe, Co, Ni, Ag, Zn, Y, La, Ce, Pr, Nd, Sm, Eu, Gd, Tb, Dy, Ho, Er, Tm, Yb, and Lu].

The metal carbonate may be a non-hydrous (unhydrated) metal carbonate for which "t" in the above Formula (III) is 0, or may be a hydrate for which "t" is a number other than 0. From the viewpoint that leaching out is little, and adsorption performance with respect to phosphorus, boron, fluorine and/or arsenic is excellent, an inorganic ion adsorbent is preferably selected from the following group (d):

(d) magnesium carbonate, calcium carbonate, strontium carbonate, barium carbonate, scandium carbonate, manganese carbonate, iron carbonate, cobalt carbonate, nickel carbonate, silver carbonate, zinc carbonate, yttrium carbonate, lanthanum carbonate, cerium carbonate, praseodymium carbonate, neodymium carbonate, samarium carbonate, europium carbonate, gadolinium carbonate, terbium carbonate, dysprosium carbonate, holmium carbonate, erbium carbonate, thulium carbonate, ytterbium carbonate, and lutetium carbonate.

As the mechanism of inorganic ion adsorption by a metal carbonate, leaching out of a metal carbonate, and recrystallization of inorganic ions and metal ions on a metal carbonate are expected. Therefore, a metal carbonate having a higher solubility has a higher adsorbing capacity, and is expected to have excellent adsorption performance. However, at the same time there is a concern about leaching out of a metal from an inorganic ion adsorbent, therefor care must be taken in an application where leaching out of a metal may cause a trouble.

An inorganic ion adsorbent constituting a porous shaped body of this embodiment may contain an impurity element mixed in from a production process thereof, or the like, to the extent that the function of the porous shaped body of this embodiment is not impaired. Examples of an impurity element to be mixed in include nitrogen (nitrate, nitrite, and ammonium), sodium, magnesium, sulfur, chlorine, potassium, calcium, copper, zinc, bromine, barium, and hafnium.

An inorganic ion adsorbent constituting a porous shaped body of this embodiment is preferably protected from aggregation at the time of drying. In order to suppress aggregation at the time of drying, it is preferable to first replace water introduced during the production with an organic liquid and then perform drying. By replacing water contained in an inorganic ion adsorbent with an organic liquid, and then performing drying, aggregation at the time of drying can be

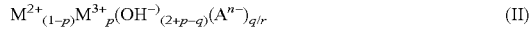

suppressed, and the pore volume of the inorganic ion adsorbent can be increased, so that the adsorption capacity of the inorganic ion adsorbent can be increased.

Although there is no particular restriction on an organic liquid used for replacement insofar as it has an effect of suppressing aggregation of inorganic ion adsorbent, it is preferable to use a liquid having high hydrophilicity. Examples thereof include an alcohol, a ketone, an ester, and an ether. Further, the organic liquid used for replacement may be a mixture of these, or a mixture with water.

The effect of suppressing aggregation of inorganic ion adsorbent is exerted owing to low surface tension of the organic liquid.

The surface tension of an organic liquid contained in an inorganic ion adsorbent at the time of drying is preferably from 0 to 30 mN/m, more preferably from 0 to 27 mN/m, and further preferably from 0 to 25 mN/m.

When the surface tension of a liquid contained in an inorganic ion adsorbent is larger than 30 mN/m, the particles thereof aggregate at the time of drying, and the pore volume of the inorganic ion adsorbent decreases to reduce the adsorption capacity.

The replacement rate of water contained in an inorganic ion adsorbent with an organic liquid is, for example in a case of ethanol at 20° C., required to be in a range of 40% by mass to 100% by mass for satisfying the above surface tension requirement, and preferably in a range of 60% by mass to 100% by mass, and more preferably in a range of 80% by mass to 100% by mass.

The replacement rate with an organic liquid is defined as the value represented by the following Formula:

$$Sb=100-Wc$$

wherein Sb stands for the replacement rate with an organic liquid (% by mass), and Wc stands for the water content of the filtrate after the treatment of an inorganic ion adsorbent containing water with the organic liquid (% by mass).

The water content of the filtrate after the treatment with an organic liquid may be determined by a measurement by the Karl Fischer method.

When the replacement rate with ethanol is less than 40% by mass, the effect of suppressing aggregation at the time of drying is reduced, and the pore volume of the inorganic ion adsorbent does not increase.

There is no particular restriction on the method of replacement with an organic liquid, and an inorganic ion adsorbent containing water may be dispersed in an organic liquid and then centrifuged and filtered, or the same may be first filtrated with a filter press, or the like and then an organic liquid may be fed thereto. In order to increase the replacement rate, it is preferable to repeat the method in which an inorganic ion adsorbent is dispersed in an organic liquid and then filtrated.

[Organic Polymer Resin]

An organic polymer resin constituting a porous shaped body of this embodiment is preferably a resin that can be made porous.

Examples of an organic polymer resin include various kinds, such as a polysulfone type polymer, a poly(vinylidene fluoride) type polymer, a poly(vinylidene chloride) type polymer, a polyacrylonitrile type polymer, a poly(methyl methacrylate) type polymer, a polyamide type polymer, a polyimide type polymer, a cellulose type polymer, an ethylene/vinyl alcohol copolymer-type polymer, poly(aryl ether sulfone), a polypropylene type polymer, a polystyrene type polymer, and a polycarbonate type polymer. Among them, from the viewpoint of non-swelling property in water, resistance to biodegradation, and ease of production, at least one selected from the group consisting of an ethylene/vinyl alcohol copolymer (EVOH), polyacrylonitrile (PAN), polysulfone (PS), poly(ether sulfone) (PES), poly(vinylidene fluoride) (PVDF), poly(methyl methacrylate) (PMMA), poly(aryl ether sulfone), polypropylene, polystyrene, polycarbonate, cellulose, and cellulose triacetate are preferable.

As an organic polymer resin, a poly(ether sulfone) having a hydroxy group at a terminal is preferable from the viewpoint of supportability. When a hydroxy group is present as a terminal group, a porous shaped body of this embodiment can develop excellent supporting performance with respect to an inorganic ion adsorbent. Further, since a highly hydrophobic organic polymer resin has a hydroxy group at the terminal, its hydrophilicity is improved. Therefore, even when the porous shaped body is used for a water treatment, fouling does not easily occur.

[Column]

When a porous shaped body of this embodiment is used as an adsorbing material, it is used after a column or an adsorption tower is filled therewith. When a column or an adsorption tower is filled therewith, and water to be treated is fed to flow in contact therewith, the high contact efficiency of the porous shaped body can be fully utilized. Further, since a porous shaped body of this embodiment has an abundance of the inorganic ion adsorbent on the surface of an adsorbing material, an ultrahigh velocity treatment can be performed with sufficiently high adsorption performance and without leaking out of an adsorption target substance even at the initial stage (break through).

A column means a cylindrical container provided with a solid-liquid separation means such as a perforated plate or a mesh on at least either of the bottom and the top to prevent the porous shaped body from flowing out.

There is no particular restriction on the material of a column, and examples thereof include stainless steel, FRP (glass fiber reinforced plastic), glass, and various plastics, such as PP (polypropylene), PE (polyethylene), PVC (poly(vinyl chloride)), and PC (polycarbonate).

In consideration of acid resistance, or base resistance, the inner surface of the column may be lined with rubber or a fluororesin.

[Cleaning Method]

When a porous shaped body of this embodiment is used as an adsorbing material, it can be cleaned in a state packed in the column or the adsorption tower.

In this embodiment, the cleaning liquid for a porous shaped body may be fed such that the cleaning liquid flows by an upward flow from the bottom of the column, the cleaning liquid flows by a downward flow from the top of the column, or the cleaning liquid flows by both of them. When the cleaning liquid is fed to flow upward, the entire column may be filled with the cleaning liquid without entrapping air at the initial stage of feeding. When the cleaning liquid is fed to flow downward, the porous shaped body does not move by the flow of the cleaning liquid, and there is no danger of wear due to contact of porous shaped bodies with each other.

In this embodiment, the flow rate of a cleaning liquid for a porous shaped body is preferably from SV 1 hr$^{-1}$ to SV 300 hr$^{-1}$, more preferably from SV 1 hr$^{-1}$ to SV 250 hr$^{-1}$ 1, and further preferably from SV 1 hr$^{-1}$ to SV 200 hr$^{-1}$. The cleaning of impurities existing inside a porous shaped body owes mainly to a diffusion effect. When the SV is smaller than 1 hr$^{-1}$, impurities stay in the cleaning liquid, and the cleaning effect by diffusion decreases. When the SV is larger than 300 hr$^{-1}$, in the case of the downward flow, the porous shaped body may be deformed due to a high pressure loss, and in the case of the upward flow, the porous shaped body may move violently inside the column to cause wear due to contact of porous shaped bodies with each other.

The feeding volume of the cleaning liquid for a porous shaped body is preferably 1 to 10,000 times the bulk volume of the porous shaped body, more preferably 2 to 7,000 times, and further preferably 3 to 5,000 times.

When a porous shaped body has a short shape, such as a particulate, cylindrical, or hollow cylindrical shape, its bulk volume is measured as an apparent volume by placing shaped bodies in a wet state in a graduated cylinder or the like.

When the flow rate of the cleaning liquid is not less than 1 times the bulk volume of a porous shaped body, impurities can be cleaned up adequately.

There is no particular restriction on a cleaning liquid for a porous shaped body in this embodiment, and one that has a high removing effect may be selected. For example, when it is desired to remove impurities adsorbed on a metal oxide that is an inorganic ion adsorbent, a sodium hydroxide solution may be used, and when it is desired to remove liberated impurities, cleaning may be performed with pure water.

Usually, anions, which are impurities to be mixed in from a raw material, or in a production process, are often adsorbed on an inorganic ion exchanger, and they should preferably be cleaned with a sodium hydroxide solution, and then cleaned with pure water.

Furthermore, a preferred cleaning liquid may be selected depending on the use after cleaning. For example, when a porous shaped body is used for a water effluent treatment, cleaning may be performed with pure water, and when used in a medical use, a physiological saline, or a physiological saline to which a blood anticoagulant has been added may be used.

The cleaning liquids may be used singly, or in combination of two or more kinds thereof

[Method for Producing Porous Shaped Body]

A method for producing a porous shaped body of this embodiment includes, for example, (1) a step of drying an inorganic ion adsorbent; (2) a step of pulverizing the inorganic ion adsorbent obtained in step (1); (3) a step of preparing a slurry by mixing the inorganic ion adsorbent obtained in step (2), a good solvent for an organic polymer resin, an organic polymer resin, and a water-soluble polymer; (4) a step of shaping the slurry obtained in step (3); (5) a step of solidifying the shaped body obtained in step (4) in a poor solvent; and (6) a step of cleaning the porous shaped body obtained in step (5).

[Step (1): Step of Drying Inorganic Ion Adsorbent]

In step (1), an inorganic ion adsorbent is dried to yield a powder. At this time, in order to suppress aggregation at the time of drying, it is preferable to dry the adsorbent after replacing water contained during the production with an organic liquid. By performing drying after replacing the water contained in an inorganic ion adsorbent with an organic liquid, aggregation at the time of drying can be suppressed, and the pore volume of the inorganic ion adsorbent can be increased, so that the adsorption capacity of the inorganic ion adsorbent can be increased.

There is no particular restriction on an organic liquid, insofar as it has an effect of suppressing aggregation of inorganic ion adsorbent, however it is preferable to use a liquid having high hydrophilicity. Examples thereof include an alcohol, a ketone, an ester, and an ether.

Further, the organic liquid used for replacement may be a mixture of these, or a mixture with water.

The effect of suppressing aggregation of inorganic ion adsorbent is exerted owing to low surface tension of the organic liquid.

The surface tension of an organic liquid contained in an inorganic ion adsorbent at the time of drying is preferably from 0 to 30 mN/m, more preferably from 0 to 27 mN/m, and further preferably from 0 to 25 mN/m.

When the surface tension of a liquid contained in an inorganic ion adsorbent is larger than 30 mN/m, the particles thereof aggregate at the time of drying, and the pore volume of the inorganic ion adsorbent decreases to reduce the adsorption capacity.

The replacement rate of water contained in an inorganic ion adsorbent with an organic liquid is, for example in a case of ethanol at 20° C., required to be in a range of 40% by mass to 100% by mass for satisfying the above surface tension requirement, and preferably in a range of 60% by mass to 100% by mass, and more preferably in a range of 80% by mass to 100% by mass.

The replacement rate with an organic liquid is defined as the value represented by the following Formula:

$$Sb = 100 - Wc$$

wherein Sb stands for the replacement rate with an organic liquid (% by mass), and Wc stands for the water content of the filtrate after the treatment of an inorganic ion adsorbent containing water with the organic liquid (% by mass).

The water content of the filtrate after the treatment with an organic liquid may be determined by a measurement by the Karl Fischer method.

When the replacement rate with ethanol is less than 40% by mass, the effect of suppressing aggregation at the time of drying is reduced, and the pore volume of the inorganic ion adsorbent does not increase.

[Step (2): Step of Pulverizing Inorganic Ion Adsorbent]

In step (2), the powder of the inorganic ion adsorbent obtained in step (1) is pulverized. There is no particular restriction on the method of pulverization, and dry pulverization or wet pulverization can be used.

There is no particular restriction on the dry pulverization method, and an impact crusher such as a hammer mill, a pneumatic pulverizer such as a jet mill, a medium type pulverizer such as a ball mil, and a compression pulverizer such as a roller mill may be used.

Among others, a pneumatic pulverizer is preferable, because the particle size distribution of a pulverized inorganic ion adsorbent can be made sharp.

There is no particular restriction on the wet pulverization method, insofar as an inorganic ion adsorbent and a good solvent for an organic polymer resin can be pulverized and mixed together, and, for example, a means usable in a physical pulverizing method, such as compressive breakdown, mechanical crushing, and an ultrasonic treatment, may be applied.

Specific examples of a pulverizing and mixing means include a generator shaft homogenizer, a blender such as a Waring blender, a medium agitation mill, such as a sand mill, a ball mill, an attritor, and a bead mill, a jet mill, a mortar and a pestle, a mortar machine, and a sonicator.

Among them, a medium agitation mill is preferable because it exhibits a high pulverizing efficiency, and is capable of pulverizing a highly viscous object.

Although there is no particular restriction on the diameter of balls used in a medium agitation mill, it is preferably from 0.1 mm to 10 mm. When the ball diameter is 0.1 mm or more, the ball mass is large enough so that the pulverizing power, and the pulverizing efficiency are high. When the ball diameter is 10 mm or less, it can be superior in fine pulverization.

There is no particular restriction on the material of the ball used in a medium agitation mil, and examples thereof include a metal, such as iron and stainless steel; and various kinds of ceramics including an oxide, such as alumina and zirconia, and a non-oxide, such as silicon nitride, and silicon carbide. Among them, zirconia is superior, because it is superior in abrasion resistance, and the product is little contaminated (contamination with abrasion debris).

[Step (3): Step of Preparing Slurry]

In step (3), a slurry is prepared by mixing the inorganic ion adsorbent obtained in step (2), a good solvent for an organic polymer resin, an organic polymer resin, and optionally a water-soluble polymer.

There is no particular restriction on a good solvent for an organic polymer resin used in step (2) and step (3), insofar as it can stably dissolve an organic polymer resin beyond 1% by mass under the production conditions of a porous shaped body, and heretofore known one may be used.

Examples of a good solvent include N-methyl-2-pyrrolidone (NMP), N,N-dimethylacetamide (DMAC), and N,N-dimethylformamide (DMF).

The good solvents may be used singly, or in combination of two or more kinds thereof Concerning the addition amount of an organic polymer resin in step (3), the percentage of (organic polymer resin)/(organic polymer resin +water-soluble polymer +good solvent for organic polymer resin) is preferably from 3% by mass to 40% by mass, and more preferably from 4% by mass to 30% by mass. When the content of an organic polymer resin is 3% by mass or more, a high strength porous shaped body can be obtained, and when it is 40% by mass or less, a porous shaped body having a high porosity can be obtained.

In step (3), a water-soluble polymer is not prerequisite, but when it is added, a porous shaped body including a fibrous structure forming a three-dimensionally continuous network structure on the outer surface and inside a porous shaped body can be formed evenly, and a porous shaped body capable of reliably adsorbing ions even at an ultrahigh water flow rate treatment can be obtained.

There is no particular restriction on a water-soluble polymer used in step (3), insofar as it is compatible with a good solvent for an organic polymer resin and an organic polymer resin.

As a water-soluble polymer, any of a natural polymer, a semisynthetic polymer, and a synthetic polymer may be used.

Examples of a natural polymer include guar gum, locust bean gum, carrageenan, gum arabic, tragacanth, pectin, starch, dextrin, gelatin, casein, and collagen.

Examples of a semisynthetic polymer include methyl cellulose, ethyl cellulose, hydroxyethyl cellulose, ethyl hydroxyethyl cellulose, carboxymethyl starch, and methyl starch.

Examples of a synthetic polymer include poly(vinyl alcohol), polyvinylpyrrolidone, poly(vinyl methyl ether), a carboxyvinyl polymer, sodium polyacrylate, a polyethylene glycol, such as tetraethylene glycol, and triethylene glycol.

Among all, a synthetic polymer is preferable from the viewpoint of enhancing the supportability of an inorganic ion adsorbent, and poly(vinyl pyrrolidone and a polyethylene glycol are more preferable from the viewpoint of improving the porosity.

The mass average molecular weight of polyvinylpyrrolidone or a polyethylene glycol is preferably from 400 to 35,000,000, more preferably from 1,000 to 1,000,000, and further preferably from 2,000 to 100,000.

When the mass average molecular weight is 400 or more, a porous shaped body having a high surface aperture is obtained, and when it is 35,000,000 or less, the viscosity of the slurry at the time of shaping is low and shaping tends to become easier.

The mass average molecular weight of a water-soluble polymer can be measured by dissolving the water-soluble polymer in a specific solvent and performing a gel permeation chromatography (GPC) analysis.

The addition amount of a water-soluble polymer is preferably from 0.1% by mass to 40% by mass in terms of the percentage of (water-soluble polymer)/(water-soluble polymer +organic polymer resin +good solvent for organic polymer resin), more preferably from 0.1% by mass to 30% by mass, and further preferably from 0.1% by mass to 10% by mass.

When the addition amount of a water-soluble polymer is 0.1% by mass or more, a porous shaped body including a fibrous structure forming a three-dimensionally continuous network structure on the outer surface and inside a porous shaped body is formed evenly. When the addition amount of a water-soluble polymer is 40% by mass or less, the outer surface aperture ratio is appropriate, and the abundance of an inorganic ion adsorbent on the outer surface of a porous shaped body is high. Therefore, a porous shaped body capable of reliably adsorbing ions even at an ultrahigh water flow rate treatment can be obtained.

In this embodiment, the viscosity of the slurry prepared in step (3) is preferably from 500 mPa·s to 10,000 mPa·s, more preferably from 1,000 mPa·s to 8,000 mPa·s, and further preferably from 1,500 mPa·s to 6,000 mPa·s. In a case in which the viscosity of the slurry is less than 500 mPa·s, when the slurry touches a solidifying liquid in the shaping step (4), a porous shaped body is apt to be deformed. Meanwhile, in a case in which the viscosity of the slurry is higher than 10,000 mPa·s, in the shaping step (4) reduction in the discharge rate, or discharge system clogging occurs, and shaping becomes difficult.

[Step (4): Shaping Step]

In step (4), the slurry (shaping slurry) obtained in step (3) is shaped. The shaping slurry is a mixture slurry of an organic polymer resin, a good solvent for an organic polymer resin, an inorganic ion adsorbent, and a water-soluble polymer.

A porous shaped body of this embodiment may take optionally a particulate, filamentous, sheet-like, hollow filamentous, cylindrical, or hollow cylindrical form depending on the method for shaping the slurry.

There is no particular restriction on the shaping method to a particulate form such as spherical particle, and for example there is rotating nozzle method, by which a shaping slurry contained in a container is scattered through a nozzle provided on the side of the rotating container to form droplets. By the rotating nozzle method, shaping to a particulate form having a narrow particle size distribution is possible.

Specifically, for example, there is a method, by which a shaping slurry is sprayed through a single fluid nozzle, or a 2 fluid nozzle, and solidified in a solidifying medium.

The diameter of the nozzle is preferably from 0.1 mm to 10 mm, and more preferably from 0.1 mm to 5 mm. When the diameter of the nozzle is 0.1 mm or more, droplets are easily scattered, and when it is 10 mm or less, the particle size distribution can be made narrow.

The centrifugal force in terms of centrifugal acceleration is preferably from 5 G to 1500 G, more preferably from 10 G to 1000 G, and further preferably from 10 G to 800 G.

When the centrifugal acceleration is 5 G or more, formation and scattering of droplets are easy, and when it is 1500 G or less, the shaping slurry is discharged without forming a filamentous form, and broadening of the particle size distribution may be inhibited. Due to the narrow particle size distribution, when the column is filled with the porous shaped bodies, the water flow paths become uniform. Therefore, there is an advantage that ions (adsorption target substance) do not leak out (break through) from the very beginning of water feed, even when it is used for an ultrahigh water flow rate treatment.

Examples of a shaping method into a filamentous or sheet-like form include a method by which a shaping slurry is extruded through a spinneret, or a die having a corresponding shape, and solidified in a poor solvent.

As for a method for shaping a porous shaped body into a hollow filamentous form, the same method as the method for shaping a porous shaped body into a filamentous or sheet-like form, except that a spinneret constituted with an annular orifice is used.

As for a method for shaping a porous shaped body into a cylindrical or hollow cylindrical form, when a shaping slurry is extruded through a spinneret, the extrudate may be solidified in a poor solvent with cutting, or the solidified filament may be chopped.

[Step (5): Solidification Step]

In step (5), the shaped article obtained in step (4), for which solidification has been promoted, is solidified in a poor solvent to yield a porous shaped body.

[Poor Solvent]

For a poor solvent to be used in step (5), a solvent which solubility of an organic polymer resin under the conditions of the step (5) is 1% by mass or less may be used, and examples thereof include water, an alcohols, such as methanol and ethanol, an ether, an aliphatic hydrocarbon, such as n-hexane, and n-heptane. Among them, water is preferable as the poor solvent.

In step (5), a good solvent is brought in from the preceding steps, and the concentration of a good solvent is changed from the start of the solidification step to the end of the same. Therefore, a good solvent may be added in advance to a poor solvent, and it is preferable to regulate the concentration in performing the solidification step by adding separately water, etc. such that the initial concentration is maintained.

By regulating the concentration of a good solvent, the structure (outer surface aperture ratio and particle shape) of a porous shaped body can be controlled.

When a poor solvent is water, or a mixture of a good solvent for an organic polymer resin and water, the content of a good solvent for an organic polymer resin with respect to water in the solidification step is preferably from 0% by mass to 80% by mass, and more preferably from 0% by mass to 60% by mass.

When the content of a good solvent for an organic polymer resin is 80% by mass or less, the effect of improving the shape of a porous shaped body may be obtained.

The temperature of a poor solvent is preferably from 40° C. to 100° C., more preferably from 50° C. to 100° C., and further preferably from 60° C. to 100° C. from the viewpoint of regulating the temperature and humidity of the space.

[Step (6): Step of Cleaning Porous Shaped Body]

In step 6, the porous shaped body obtained in step (5) is cleaned.

[Column]

Cleaning of a porous shaped body is performed in a state where a column is filled with the porous shaped body.

A column means a cylindrical container provided with a solid-liquid separation means such as a perforated plate or a mesh on at least either of the bottom and the top to prevent the porous shaped body from flowing out.

There is no particular restriction on the material of a column, and examples thereof include stainless steel, FRP (glass fiber reinforced plastic), glass, and various plastics, such as PP (polypropylene), PE (polyethylene), PVC (poly (vinyl chloride)), and PC (polycarbonate).

In consideration of acid resistance, or base resistance, the inner surface of the column may be lined with rubber or a fluororesin.

[Cleaning Method]

When a porous shaped body of this embodiment is used as an adsorbing material, it can be cleaned in a state packed in the column or the adsorption tower.

In this embodiment, the cleaning liquid for a porous shaped body may be fed such that the cleaning liquid flows by an upward flow from the bottom of the column, the cleaning liquid flows by a downward flow from the top of the column, or the cleaning liquid flows by both of them. When the cleaning liquid is fed to flow upward, the entire column may be filled with the cleaning liquid without entrapping air at the initial stage of feeding. When the cleaning liquid is fed to flow downward, the porous shaped body does not move by the flow of the cleaning liquid, and there is no danger of wear due to contact of porous shaped bodies with each other.

In this embodiment, the flow rate of a cleaning liquid for a porous shaped body is preferably from SV 1 $hr^{-1}$ to SV 300 $hr^{-1}$, more preferably from SV 1 $hr^{-1}$ to SV 250 $hr^{-1}$ 1, and further preferably from SV 1 $hr^{-1}$ to SV 200 $hr^{-1}$. The cleaning of impurities existing inside a porous shaped body owes mainly to a diffusion effect. When the SV is smaller than 1 $hr^{-1}$, impurities stay in the cleaning liquid, and the cleaning effect by diffusion decreases. When the SV is larger than 300 $hr^{-1}$, in the case of the downward flow, the porous shaped body may be deformed due to a high pressure loss, and in the case of the upward flow, the porous shaped body may move violently inside the column to cause wear due to contact of porous shaped bodies with each other.

The feeding volume of the cleaning liquid for a porous shaped body is preferably 1 to 10,000 times the bulk volume of the porous shaped body, more preferably 2 to 7,000 times, and further preferably 3 to 5,000 times.

When a porous shaped body has a short shape, such as a particulate, cylindrical, or hollow cylindrical shape, its bulk volume is measured as an apparent volume by placing shaped bodies in a wet state in a graduated cylinder or the like.

When the flow rate of the cleaning liquid is not less than 1 time the bulk volume of a porous shaped body, impurities can be cleaned up adequately.

There is no particular restriction on a cleaning liquid for a porous shaped body in this embodiment, and one that has a high removing effect may be selected.

For example, when it is desired to remove impurities adsorbed on a metal oxide that is an inorganic ion adsorbent, a sodium hydroxide solution may be used, and when it is desired to remove liberated impurities, cleaning may be performed with pure water.

Usually, anions, which are impurities to be mixed in from a raw material, or in a production process, are often adsorbed on an inorganic ion exchanger, and they should preferably be cleaned with a sodium hydroxide solution, and then cleaned with pure water.

Furthermore, a preferred cleaning liquid may be selected depending on the use after cleaning. For example, when a porous shaped body is used for a water effluent treatment, cleaning may be performed with pure water, and when used in a medical use, a physiological saline, or a physiological saline to which a blood anticoagulant has been added may be used.

The cleaning liquids may be used singly, or in combination of two or more kinds thereof

[Apparatus for Producing Porous Shaped Body]

An apparatus for producing a porous shaped body of this embodiment includes, for example, a rotating container that scatters droplets by a centrifugal force, and a solidification tank that stores a solidifying liquid.

The rotating container that scatters droplets by a centrifugal force is not limited to those having a specific structure insofar as it is capable of forming a shaping slurry into spherical droplets, and scattering them by a centrifugal force. For example, there are a rotating disk, and a rotating nozzle as well known.

In the case of a rotating disk, a shaping slurry is supplied to the center of the rotating disk, the shaping slurry is spread over the surface of the rotating disk in the form of a film with a uniform thickness, and splits into droplets from the periphery of the disk by a centrifugal force, which are scattered as tiny droplets.

In the case of a rotating nozzle, a large number of through-holes are formed in the peripheral wall of a hollow disk-shaped rotating container, or nozzles are attached through the peripheral wall, and a shaping slurry is supplied into the rotating container, which rotates and discharges the shaping slurry through the through-holes, or the nozzles by a centrifugal force to form droplets.

The solidification tank for storing a solidifying liquid is not limited to those having a specific structure insofar as it has a function of storing a solidifying liquid. For example, there are a well-known solidification tank with an open top surface, and a solidification tank having a structure in which a solidifying liquid flows down naturally by gravity coursing the inner surface of a cylindrical body placed around the rotating container.

A solidification tank with an open top surface is an apparatus to capture droplets, which are scattered in a horizontal direction from the rotating container and allowed to fall naturally, at the surface of the solidifying liquid stored in the solidification tank with an open top surface.

A solidification tank having a structure in which a solidifying liquid flows down naturally by gravity coursing the inner surface of a cylindrical body placed around the rotating container is an apparatus to capture and solidify droplets in the solidifying liquid which is discharged along the inner surface of the cylindrical body at a flow rate nearly uniform in the circumferential direction, and allowed to flow down naturally coursing the inner surface.

[Use of Porous Shaped Body]

A porous shaped body of this embodiment can be used in the field where a treatment is performed at an ultrahigh velocity such as a flow rate (SV) of 120 $hr^{-1}$ or SV 240 $hr^{-1}$. In particular, it can be suitably used as an adsorbing material for ions, such as phosphorus, boron, arsenic, and fluorine, in a production process water application for metal coating, pharmaceutical production, etc. Among them, use as an adsorbing material for a phosphate ion is more favorable.

A porous shaped body of this embodiment, in which interconnecting pores are densely developed forming a three-dimensional network, has a high contact efficiency between the inorganic ion adsorbent and ions, and further has a high adsorption capacity owing to the large pore volume of the inorganic ion adsorbent.

Taking advantage of the high contact efficiency and the high adsorption capacity, it can be used for a water treatment, especially for metal coating and pharmaceutical production, and it can be also used for a medical application such as blood processing.

A porous shaped body of this embodiment may be also used in an application, such as various adsorbing materials, a deodorant, an antibacterial agent, a hygroscopic agent, a freshness-preserving agent for food, an enzyme immobilized support, and a carrier for chromatography.

In this embodiment, for example, when zeolite is used for an inorganic ion adsorbent, the porous shaped body can be used as a deodorant.

When an inorganic ion adsorbent is zeolite, and silver is supported on the zeolite, the same can be used as an antibacterial agent. When palladium or platinum is supported on the zeolite, the same can be used as a freshness-preserving agent, because it adsorbs ethylene. When silver or copper is supported on the zeolite, the same can be used as a deodorant, because it can adsorb and decompose a bad odor gas, such as hydrogen sulfide, ammonia, and methyl mercaptan.

EXAMPLES

The present invention will be specifically described below with reference to Examples and Comparative Examples, provided that the present invention is not limited thereto. The physical properties of a shaped body were measured by the following methods.

(1) Pore Volume, and Specific Surface Area Measured by Nitrogen Gas Adsorption Method A porous shaped body was freeze-dried and then measured with a specific surface area and pore size distribution measuring device (BELSORP-MINI II (trade name), manufactured by MicrotracBEL Corp.).

About 0.3 g of a freeze-dried porous shaped body was weighed, and placed in a dedicated 5 mL glass cell. Measurements of the pore volume and the specific surface area were carried out by adsorption and desorption of a nitrogen gas, while cooling the glass cell with liquid nitrogen.

A nitrogen gas having a purity of 99.99% by volume or higher was used as the adsorbate, and a helium gas having a purity of 99.99% by volume or higher was used as the purge gas.

As a reference cell, an empty glass cell having the same volume as the glass cell for measurement was used, and a measurement was performed with the setting that the measured value should be corrected.

Measurements were conducted by a simplified measurement method with the setting that the upper limit of the adsorption relative pressure was 0.95, and the lower limit of the desorption relative pressure was 0.3.

The analyses by the BET method and the BJH method after the measurement were performed using an analysis software (BEL Master (Version 6.3.1.0), produced by MicrotracBEL Corp.).

(2) Freeze-Drying of Porous Shaped Body

Freeze-drying was performed using a freeze-drying machine (FDS-1000 (trade name) manufactured by EYELA).

From 1 to 10 mL of a porous shaped body in a wet state was measured with a graduated cylinder or the like, and placed in a 100 mL glass recovery flask, which was then left standing in a freezer at −18° C. or lower for 6 hours or longer to freeze moisture contained. Then the recovery flask was connected with the freeze-drying machine to perform freeze-drying for 10 hours under the conditions that the degree of vacuum was 20 Pa or less, and a trap temperature was −80° C. or less.

(3) Average Particle Diameter of Porous Shaped Body, and Average Particle Diameter of Inorganic Ion Adsorbent The average particle diameter of a porous shaped body and the average particle diameter of an inorganic ion adsorbent were measured with a laser diffraction/scattering particle size analyzer (LA-950 (trade name) manufactured by Horiba, Ltd.). Water was used as a dispersion medium. In the measurement of a sample using hydrated cerium oxide as the inorganic ion adsorbent, the measurement was performed using the value of cerium oxide for the refractive index. Similarly, in the measurement of a sample using hydrated zirconium oxide as the inorganic ion adsorbent, the measurement was performed using the value of zirconium oxide for the refractive index.

(4) Pore Volume and Modal Pore Diameter of Porous Shaped Body Measured by Mercury Intrusion Method, A porous shaped body was freeze-dried by the aforedescribed method, and then measured with a mercury porosimeter (Shimadzu AutoPore IV 9500, manufactured by Shimadzu Corporation).

(5) Elastic Modulus of Porous Shaped Body

An elastic modulus was measured with a compression-type elastic modulus measuring device (EZ-Test-500N (trade name) manufactured by Shimadzu Corporation). Using a graduated cylinder or the like, 1 mL-bulk volume of a porous shaped body in a wet state was measured, placed in a dedicated 1 mL cell, compressed with a cylindrical compression jig with a diameter of 10 mm at a stroke velocity of 1 mm/min. Then, a measurement was performed thereon.

(6) Measurement of Viscosity of Slurry

Step (3): The viscosity of a slurry prepared in the step of preparing a slurry was measured by placing the slurry in a cylindrical container having a diameter of 50 mm and a depth of 70 mm after regulating the temperature within 25° C. ±1° C., and using a B-type viscometer (RB-85L (trade name) manufactured by Toki Sangyo Co., Ltd.). A viscosity measurement was performed, where a rotor No. 3 (trade name) was use, and the rotation velocity was 0.3 rpm to 60 rpm.

(7) Measurement of Anion Concentration

A porous shaped body was immersed in water in an amount 10 times the bulk volume of the same at 70° C. for 1 hour, and the anion concentrations in the water after the immersion were measured by ion chromatography (DION-EXICS-2100 (trade name), manufactured by ThremoSCIENTIFIC). The sum total of the concentration of each anion species was calculated and defined as the anion concentration. Measurements of a phosphate ion, a sulfate ion, a nitrite ion, a bromide ion, a nitrate ion, a fluoride ion, and a chloride ions were performed using Anion Mixture Standard Solution 1 (product name, FUJIFILM Wako Pure Chemical Corporation) as the standard solution.

(8) Measurement of Metal Concentration

A porous shaped body was immersed in water in an amount 10 times the bulk volume of the same at 70° C. for 1 hour, and the metal concentration in the water after the immersion was measured by an inductively-coupled plasma mass spectrometer (iCAPQ (trade name) manufactured by ThremoSCIENTIFIC). As the standard solution, a standard solution containing a metal element ion constituting an inorganic ion adsorbent was used. For example, when an inorganic ion adsorbent is hydrated cerium oxide, a Cerium Standard Solution (1,000 ppm) (product name, FUJIFILM Wako Pure Chemical Corporation) was used.

(9) Measurement of UV Absorbance

A porous shaped body was immersed in water in an amount 10 times the bulk volume of the same at 70° C. for 1 hour, and the liquid after the immersion was placed in a quartz glass cell having an optical path length of 1 cm, which absorbance was measured in a wavelength range of 200 nm to 350 nm using a UV-Vis spectrophotometer (UV-2400PC manufactured by Shimadzu Corporation). The maximum value of absorbance was regarded as a measured value.

(10) Measurement of pH and Amount of Change of pH

A porous shaped body was immersed in water in an amount 10 times the bulk volume of the same at 70° C. for 1 hour, and pH was measured on the liquid after the immersion with a pH meter (pH/Cond Meter D-54 manufactured by Horiba, Ltd.).

The amount of change of pH was defined as the absolute value of the difference between the above measured value and the value obtained by a measurement with a pH meter with respect to the liquid prepared by heating the same amount of pure water at 70° C. for 1 hour.

(11) Abrasion Rate

As for an abrasion rate, 5 mL of a porous shaped body and 50 mL of pure water were charged into a 100 mL container having a height of 5 to 10 cm, and reciprocating shaking was performed thereon at a velocity of 250 rpm for 30 min. The supernatant liquid was filtrated with suction using a 0.2 μm filter, and the dry weight of the obtained abraded component "Wd", and the dry weight of 5 mL of the porous shaped body after the reciprocating shaking "We" were weighed, and the abrasion rate was determined according to the following Formula:

$$\text{Abrasion rate (\%)} = [Wd/(We+Wd)] \times 100$$

When the abrasion rate was less than 0.1% by mass, it was judged that abrasion was little and rated good.

(12) Pressure Loss

A column having an inner diameter of 20 mmφ and a height of 500 mm was filled with 60 mL of a porous shaped body. Pure water was fed to flow from the top to the bottom of the column at a velocity of LV 20 m/hr, and the difference (A (kPa)) between the inlet pressure and the outlet pressure was measured. Then, pure water was fed to flow from the top to the bottom of the empty column without the adsorbent at a velocity of LV 20 m/hr, and the difference (B (kPa)) between the inlet pressure and the outlet pressure was measured. Measuring the fill height (H) of the adsorbent, a pressure loss (A−B)/H (kPa/m) was calculated.

When the value of a pressure loss was less than 50 kPa/m, it was judged that the pressure rise was small and rated good.

(13) Adsorption Amount of Phosphorus

Trisodium phosphate ($Na_3PO_4 \cdot 12H_2O$) was dissolved in distilled water to prepare a solution with a phosphorus concentration of 9 mg-P/L, and the solution was adjusted to pH 7 with sulfuric acid, and used as an adsorption stock liquid.

A column (inner diameter 10 mm) was filled with 8 mL of porous shaped body measured using a graduated cylinder with repeated tapping, to which the adsorption stock liquid was fed to flow at a velocity of 960 mL/hr (SV 120 hr$^{-1}$), and 1,920 mL/hr (SV 240 hr$^{-1}$) respectively.

The effluent (treated liquid) from the column was sampled every 10 min, and the phosphorus concentration in the treated water was measured, and the total adsorbed mass (g-P/L-porous shaped body) during a 4-hour flow was determined.

A phosphate ion concentration was measured using a phosphoric acid measuring device (PHOSPHAX Compact (trade name) manufactured by Hach Company).

When the total adsorbed mass of phosphorus at the velocity of SV 120 hr$^{-1}$ was 1.8 (g-P/L-porous shaped body) or more, it was rated that the porous shaped body had a high adsorption capacity, and was excellent as a phosphorus adsorbent. When it was 2.5 (g-P/L-porous shaped body) or more, it was rated even better.

Example 11

In 50 L of pure water, 2000 g of cerium sulfate tetrahydrate (Wako Pure Chemical Industries, Ltd.) was added and dissolved using a stirring blade, and then 3 L of 8M caustic soda (Wako Pure Chemical Industries, Ltd.) was dropped thereto at a rate of 20 mL/min. As a result, a precipitate of hydrated cerium oxide was yielded. The yielded precipitate was filtered with a filter press, irrigating the same with 500 L of pure water, and successively with 80 L of ethanol (Wako Pure Chemical Industries, Ltd.) to replace the water contained in hydrated cerium oxide with ethanol. At this time, 10 mL of the filtrate at the end of the filtration was sampled, and its water content was analyzed with a Karl Fisher water content meter (CA-200 (trade name) manufactured by Mitsubishi Chemical Analytech Co., Ltd.) to find that the water content was 5% by mass, and the replacement rate with the organic liquid was 95% by mass. The obtained hydrated cerium oxide containing the organic liquid was air-dried to obtain dried hydrated cerium oxide.

The obtained dry hydrated cerium oxide was pulverized using a jet mill (SJ-100 (trade name), manufactured by Nisshin Engineering Inc.) under the conditions of a compressed air pressure of 0.8 MPa and a raw material feed rate of 100 g/hr.

A uniform shaping slurry solution was yielded by charging 220 g of N-methyl-2-pyrrolidone (NMP, Mitsubishi Chemical Corporation), 150 g of a ground hydrated cerium oxide powder, and 40 g of polyethersulfone in a dissolving tank, and then heating the content to 60° C. to be dissolved with stirring using a stirring blade.

The yielded shaping slurry was supplied into a cylindrical rotating container having nozzle holes with a diameter of 4 mm opened on the side surface, the container was rotated to form liquid droplets through the nozzle holes by a centrifugal force (15 G). The droplets were made to land and solidified on an open top surface of a solidifying tank storing a solidifying liquid which contained NMP at 50% by mass with respect to water, and was heated to 60° C.

The solidified porous shaped body was recovered, and a column having an inner diameter of 20 mmϕ) was filled with 150 mL of the porous shaped body. For alkali washing, 1500 mL of a 0.4 wt % aqueous solution of sodium hydroxide heated to 70° C. was fed to the column to flow from the top to the bottom at SV 10 hr$^{-1}$. Further, washing with water was conducted by feeding 450 L of pure water to the column to flow from the top to the bottom at SV 80 hr$^{-1}$ thereby obtaining a cleaned porous shaped body.

Example 2

A spherical porous shaped body was obtained in the same manner as described in Example 1 except that the feeding amount of ethanol was changed to 60 L, and the replacement rate with the organic liquid was changed to 83% by mass.

Example 3

A spherical porous shaped body was obtained in the same manner as described in Example 1 except that the feeding amount of ethanol was changed to 40 L, and the replacement rate with the organic liquid was changed to 72% by mass.

Example 4

A spherical porous shaped body was obtained in the same manner as described in Example 1 except that the feeding amount of ethanol was changed to 20 L, and the replacement rate with the organic liquid was changed to 54% by mass.

Example 5

A spherical porous shaped body was obtained in the same manner as described in Example 1 except that 5 g of polyvinylpyrrolidone (PVP, produced by BASF) was added as a water-soluble polymer to the slurry.

Example 6

A spherical porous shaped body was obtained in the same manner as described in Example 1 except that the amount of the hydrated cerium oxide powder was changed to 300 g.

Example 7

A spherical porous shaped body was obtained in the same manner as described in Example 1 except that the amount of the hydrated cerium oxide powder was changed to 120 g.

Example 8

A spherical porous shaped body was obtained in the same manner as described in Example 1 except that the amount of the hydrated cerium oxide powder was changed to 80 g.

Example 9

A spherical porous shaped body was obtained in the same manner as described in Example 1 except that the amount of the hydrated cerium oxide powder was changed to 50 g.

Example 10

A spherical porous shaped body was obtained in the same manner as described in Example 1 except that the amount of the hydrated cerium oxide powder was changed to 40 g.

Example 11

A spherical porous shaped body was obtained in the same manner as described in Example 1 except that the amount of the hydrated cerium oxide powder was changed to 30 g.

Example 12

A spherical porous shaped body was obtained in the same manner as described in Example 1 except that the amount of the hydrated cerium oxide powder was changed to 20 g.

Example 13

A spherical porous shaped body was obtained in the same manner as described in Example 1 except that the amount of the hydrated cerium oxide powder was changed to 17 g.

Example 14

A spherical porous shaped body was obtained in the same manner as described in Example 1 except that the diameter of the nozzle was changed to 3.5 mm.

Example 15

A spherical porous shaped body was obtained in the same manner as described in Example 1 except that the diameter of the nozzle was changed to 3.0 mm.

Example 16

A spherical porous shaped body was obtained in the same manner as described in Example 1 except that the amount of N-methyl-2-pyrrolidone was changed to 240 g and the diameter of the nozzle was changed to 4.5 mm.

Example 17

A spherical porous shaped body was obtained in the same manner as described in Example 1 except that sodium dodecyl sulfate (Wako Pure Chemical Industries, Ltd.) was added to the poor solvent at a concentration of 2,000 mg/L.

Example 18

A spherical porous shaped body was obtained in the same manner as described in Example 1 except that a solidifying liquid containing NMP at 60% by mass with respect to water was used.

Example 19

A spherical porous shaped body was obtained in the same manner as described in Example 1 except that the temperature of the solidifying liquid was changed to 80° C.

Example 20

A spherical porous shaped body was obtained in the same manner as described in Example 1 except that the amount of N-methyl-2-pyrrolidone was changed to 250 g and the diameter of the nozzle was changed to 3.5 mm.

Example 21

A spherical porous shaped body was obtained in the same manner as described in Example 1 except that the solidifying liquid was changed to water, namely the solidifying liquid with an NMP content of 0% by mass with respect to water was used.

Example 22

A spherical porous shaped body was obtained in the same manner as described in Example 1 except that the temperature of the solidifying liquid was changed to 25° C.

Example 23

A spherical porous shaped body was obtained in the same manner as described in Example 1 except that the temperature of the solidifying liquid was changed to 25° C., and the solidifying liquid was changed to water, namely the solidifying liquid with an NMP content of 0% by mass with respect to water was used.

Example 24

A spherical porous shaped body was obtained in the same manner as described in Example 1 except that the diameter of the nozzle was changed to 2.5 mm.

Example 25

A spherical porous shaped body was obtained in the same manner as described in Example 1 except that the diameter of the nozzle was changed to 5.0 mm.

Example 26

A spherical porous shaped body was obtained in the same manner as described in Example 10 except that the temperature of the solidifying liquid was changed to 80° C.

Example 27

A spherical porous shaped body was obtained in the same manner as described in Example 10 except that the temperature of the solidifying liquid was changed to 80° C., and its NMP content with respect to water was changed to 60% by mass.

Example 28

A spherical porous shaped body was obtained in the same manner as described in Example 10 except that the amount of N-methyl-2-pyrrolidone was changed to 180 g.

Example 29

A spherical porous shaped body was obtained in the same manner as described in Example 10 except that the amount of N-methyl-2-pyrrolidone was changed to 140 g.

Example 30

A spherical porous shaped body was obtained in the same manner as described in Example 10 except that the content of NMP in the solidifying liquid with respect to water was changed to 0% by mass.

Example 31

A spherical porous shaped body was obtained in the same manner as described in Example 10 except that the content of NMP in the solidifying liquid with respect to water was changed to 0% by mass, and further the temperature was changed to 25° C.

Example 32

A spherical porous shaped body was obtained in the same manner as described in Example 1 except that the pressure of the compressed air was changed to 0.6 MPa when hydrated cerium oxide was pulverized using a jet mill.

Example 33

A spherical porous shaped body was obtained in the same manner as described in Example 1 except that the pressure of the compressed air was changed to 0.5 MPa when hydrated cerium oxide was pulverized using a jet mill, and the raw material feed rate was changed to 200 g/hr.

Example 34

A spherical porous shaped body was obtained in the same manner as described in Example 1 except that the pressure of the compressed air was changed to 0.9 MPa when hydrated cerium oxide was pulverized using a jet mill, and the raw material feed rate was changed to 50 g/hr.

Example 35

A spherical porous shaped body was obtained in the same manner as described in Example 1 except that the method for pulverizing the hydrated cerium oxide obtained by air-drying was changed to wet ball mill pulverization in preparing a slurry. In the ball mill pulverization, 150 g of the hydrated cerium oxide obtained by air-drying, and 220 g of N-methyl-2-pyrrolidone were charged into a 1 L-stainless steel ball mill pot filled with 1.5 kg of stainless steel balls with a diameter of 5 mmϕ, and pulverizing and mixing operation was performed at a rotation rate of 150 rpm for 150 min to obtain a yellow slurry. In a dissolving tank, 40 g of polyethersulfone was added to the obtained slurry, and the mixture was heated to 60° C. and stirred using a stirring blade to be dissolved and form a uniform shaping slurry.

Example 36

A spherical porous shaped body was obtained in the same manner as described in Example 1 except that the method for pulverizing hydrated cerium oxide was changed to a method in which pulverization was performed with a mortar for 5 min.

Example 3

A spherical porous shaped body was obtained in the same manner as described in Example 35 except that the pulverization time in pulverizing the hydrated cerium oxide obtained by air drying by wet ball mill pulverization was changed to 60 min.

Example 38

A spherical porous shaped body was obtained in the same manner as described in Example 1 except that the concentration of the aqueous solution of sodium hydroxide used for washing was changed to 1.0 wt %.

Example 39

A spherical porous shaped body was obtained in the same manner as described in Example 1 except that the concentration of the aqueous solution of sodium hydroxide used for washing was changed to 0.1 wt %.

Example 40

A spherical porous shaped body was obtained in the same manner as described in Example 1 except that the raw material for an inorganic ion adsorbent was changed to cerium (III) chloride heptahydrate (Wako Pure Chemical Industries, Ltd.).

Example 41

A spherical porous shaped body was obtained in the same manner as described in Example 1 except that washing with the aqueous solution of sodium hydroxide was not carried out.

Example 42

A spherical porous shaped body was obtained in the same manner as described in Example 1 except that washing with the aqueous solution of sodium hydroxide and pure water was not carried out.

Comparative Example 1

A spherical porous shaped body was obtained in the same manner as described in Example 1 except that the feeding amount of ethanol was changed to 4 L and the replacement rate with the organic liquid was 14% by mass.

Comparative Example 2

A spherical porous shaped body was obtained in the same manner as described in Example 1 except that the feeding amount of ethanol was changed to 0 L and the replacement rate with the organic liquid was changed to 0% by mass.

Comparative Example 3

A spherical porous shaped body was obtained in the same manner as described in Example 1 except that the feeding amount of ethanol was changed to 0 L, the replacement rate with an organic liquid was changed to 0% by mass, and the hydrated cerium oxide powder was set at 500 g.

Comparative Example 4

A spherical porous shaped body was obtained in the same manner as described in Example 1 except that the addition amount of the hydrated cerium oxide powder was changed to 0 g.

Comparative Example 5

A spherical porous shaped body was obtained in the same manner as described in Example 1 except that the compressed air pressure was changed to 0.9 MPa, and the raw material feed rate was changed to 20 g/hr.

Comparative Example 6

A spherical porous shaped body was obtained in the same manner as described in Example 35 except that the pulverization time in pulverizing the hydrated cerium oxide obtained by air drying by wet ball mill pulverization was changed to 600 min.

Comparative Example 7

A spherical porous shaped body was obtained in the same manner as described in Comparative Example 1 except that washing with the aqueous solution of sodium hydroxide was not performed.

The physical properties, etc. of the porous shaped bodies obtained in Examples 1 to 42, and Comparative Examples 1 to 7 are shown in Table 1 below ([Table 1-2], [Table 1-3], [Table 1-4], and [Table 1-5] are continuations of [Table 1-1].)

TABLE 1

| | Example 1 | Example 2 | Example 3 | Example 4 | Example 5 |
|---|---|---|---|---|---|
| Organic polymer resin | PES | PES | PES | PES | PES |
| Water-soluble polymer | — | — | — | — | PVP |
| Inorganic ion adsorbent raw material | Sulfate | Sulfate | Sulfate | Sulfate | Sulfate |
| Inorganic ion adsorbent | C | C | C | C | C |
| Replacement rate with ethanol in inorganic ion adsorbent (% by mass) | 95 | 83 | 72 | 54 | 95 |
| Supported amount of inorganic ion adsorbent (% by mass) | 79 | 79 | 79 | 79 | 79 |
| Sum total of pore volumes per unit mass of inorganic ion adsorbent measured by nitrogen gas adsorption method ($cm^3/g$) | 0.39 | 0.25 | 0.18 | 0.09 | 0.38 |
| Pulverization method of inorganic ion exchanger | Jet mill | Jet mill | Jet mill | Jet mill | Jet mill |
| Average particle diameter of inorganic ion adsorbent (μm) | 1.03 | 0.98 | 1.01 | 1.05 | 1.03 |
| Ratio of (maximum particle diameter)/(minimum particle diameter) of inorganic ion adsorbent | 67 | 77 | 80 | 75 | 67 |
| Viscosity of stock liquid (mPa · s) | 2074 | 1964 | 1855 | 1808 | 3566 |
| Granulation by rotating nozzle method | Possible | Possible | Possible | Possible | Possible |
| Solidification tank temperature (° C.) | 60 | 60 | 60 | 60 | 60 |
| NMP concentration in solidification tank (% by mass) | 50 | 50 | 50 | 50 | 50 |
| Concentration of surfactant added to solidification tank (mg/L) | 0 | 0 | 0 | 0 | 0 |
| Nozzle diameter (mm) | 4 | 4 | 4 | 4 | 4 |
| Average particle diameter of porous shaped body (μm) | 545 | 535 | 541 | 544 | 549 |
| Pore volume of porous shaped body measured by nitrogen gas adsorption method ($cm^3/g$) | 0.31 | 0.20 | 0.14 | 0.09 | 0.30 |
| Specific surface area of porous shaped body measured by nitrogen gas adsorption method ($m^2/g$) | 224 | 168 | 134 | 98 | 193 |
| Flatness ratio of porous shaped body | 0.10 | 0.12 | 0.11 | 0.11 | 0.02 |
| Bulk density of porous shaped body (g/mL-porous shaped body) | 0.51 | 0.49 | 0.49 | 0.51 | 0.50 |
| Pore volume measured by mercury intrusion method ($cm^3/g$) | 1.11 | 1.07 | 1.03 | 1.04 | 1.02 |
| Modal pore diameter measured by mercury intrusion method (μm) | 0.14 | 0.12 | 0.13 | 0.13 | 0.25 |
| Elastic modulus of porous shaped body ($mN/m^2$) | 6250 | 6140 | 6022 | 6102 | 6203 |
| Abrasion rate of porous shaped body (% by mass) | 0.02 | 0.03 | 0.04 | 0.08 | 0.07 |
| Sodium hydroxide concentration at the time of washing (% by mass) | 0.4 | 0.4 | 0.4 | 0.4 | 0.4 |

TABLE 1-continued

|  |  |  |  |  |  |
|---|---|---|---|---|---|
| Sodium hydroxide feed amount at the time of washing (times) | 10 | 10 | 10 | 10 | 10 |
| Sodium hydroxide flow rate at the time of washing (h$^{-1}$) | 10 | 10 | 10 | 10 | 10 |
| Pure water feed amount at the time of washing (times) | 300 | 300 | 300 | 300 | 300 |
| Pure water feed rate at the time of washing (h$^{-1}$) | 80 | 80 | 80 | 80 | 80 |
| Leached anion concentration (mg/L) | 0.2 | 0.1 | 0.2 | 0.1 | 0.0 |
| UV absorbance | 0.00 | 0.00 | 0.00 | 0.01 | 0.15 |
| Leached metal ion concentration (mg/L) | <0.0001 | <0.0001 | <0.0001 | 0.0003 | <0.0001 |
| pH | 6.0 | 6.2 | 6.6 | 6.3 | 6.1 |
| pH change amount | 0.2 | 0.3 | 0.5 | 0.3 | 0.2 |
| Pressure loss at LV 20 m/hr (kPa/m) | 24 | 25 | 22 | 26 | 18 |
| Phosphorus adsorption amount (g-P/L- porous shaped body), SV120 h$^{-1}$ | 3.76 | 3.50 | 3.27 | 2.42 | 4.11 |
| Phosphorus adsorption amount (g-P/L- porous shaped body), SV240 h$^{-1}$ | 4.21 | 3.92 | 3.66 | 2.98 | 4.64 |

|  | Example 6 | Example 7 | Example 8 | Example 9 | Example 10 |
|---|---|---|---|---|---|
| Organic polymer resin | PES | PES | PES | PES | PES |
| Water-soluble polymer | — | — | — | — | — |
| Inorganic ion adsorbent raw material | Sulfate | Sulfate | Sulfate | Sulfate | Sulfate |
| Inorganic ion adsorbent | C | C | C | C | C |
| Replacement rate with ethanol in inorganic ion adsorbent (% by mass) | 95 | 95 | 95 | 95 | 95 |
| Supported amount of inorganic ion adsorbent (% by mass) | 88 | 75 | 67 | 56 | 50 |
| Sum total of pore volumes per unit mass of inorganic ion adsorbent measured by nitrogen gas adsorption method (cm$^3$/g) | 0.36 | 0.36 | 0.34 | 0.36 | 0.35 |
| Pulverization method of inorganic ion exchanger | Jet mill | Jet mill | Jet mill | Jet mill | Jet mill |
| Average particle diameter of inorganic ion adsorbent (μm) | 1.03 | 1.03 | 1.03 | 1.03 | 1.03 |
| Ratio of (maximum particle diameter)/(minimum particle diameter) of inorganic ion adsorbent | 67 | 67 | 67 | 67 | 67 |
| Viscosity of stock liquid (mPa · s) | 3251 | 2003 | 1713 | 1608 | 1531 |
| Granulation by rotating nozzle method | Possible | Possible | Possible | Possible | Possible |
| Solidification tank temperature (° C.) | 60 | 60 | 60 | 60 | 60 |
| NMP concentration in solidification tank (% by mass) | 50 | 50 | 50 | 50 | 50 |
| Concentration of surfactant added to solidification tank (mg/L) | 0 | 0 | 0 | 0 | 0 |
| Nozzle diameter (mm) | 4 | 4 | 4 | 4 | 4 |
| Average particle diameter of porous shaped body (μm) | 537 | 544 | 554 | 548 | 551 |
| Pore volume of porous shaped body measured by nitrogen gas adsorption method (cm$^3$/g) | 0.32 | 0.27 | 0.23 | 0.20 | 0.18 |
| Specific surface area of porous shaped body measured by nitrogen gas adsorption method (m$^2$/g) | 194 | 212 | 207 | 191 | 211 |
| Flatness ratio of porous shaped body | 0.03 | 0.13 | 0.21 | 0.22 | 0.25 |
| Bulk density of porous shaped body (g/mL-porous shaped body) | 0.59 | 0.45 | 0.41 | 0.34 | 0.32 |

TABLE 1-continued

|  | | | | | |
|---|---|---|---|---|---|
| Pore volume measured by mercury intrusion method (cm³/g) | 0.68 | 1.23 | 1.28 | 1.31 | 1.35 |
| Modal pore diameter measured by mercury intrusion method (μm) | 0.14 | 0.16 | 0.18 | 0.18 | 0.21 |
| Elastic modulus of porous shaped body (mN/m²) | 8102 | 5551 | 4203 | 3408 | 3098 |
| Abrasion rate of porous shaped body (% by mass) | 0.17 | 0.02 | 0.00 | 0.00 | 0.00 |
| Sodium hydroxide concentration at the time of washing (% by mass) | 0.4 | 0.4 | 0.4 | 0.4 | 0.4 |
| Sodium hydroxide feed amount at the time of washing (times) | 10 | 10 | 10 | 10 | 10 |
| Sodium hydroxide flow rate at the time of washing (h⁻¹) | 10 | 10 | 10 | 10 | 10 |
| Pure water feed amount at the time of washing (times) | 300 | 300 | 300 | 300 | 300 |
| Pure water feed rate at the time of washing (h⁻¹) | 80 | 80 | 80 | 80 | 80 |
| Leached anion concentration (mg/L) | 0.3 | 0.2 | 0.2 | 0.1 | 0.0 |
| UV absorbance | 0.04 | 0.00 | 0.00 | 0.00 | 0.00 |
| Leached metal ion concentration (mg/L) | 0.0012 | <0.0001 | <0.0001 | <0.0001 | <0.0001 |
| pH | 6.3 | 6.2 | 6.0 | 6.9 | 5.8 |
| pH change amount | 0.2 | 0.3 | 0.1 | 0.7 | 0.0 |
| Pressure loss at LV 20 m/hr (kPa/m) | 26 | 32 | 36 | 37 | 41 |
| Phosphorus adsorption amount (g-P/L- porous shaped body), SV120 h⁻¹ | 3.88 | 3.62 | 3.33 | 3.11 | 2.97 |
| Phosphorus adsorption amount (g-P/L- porous shaped body), SV240 h⁻¹ | 4.42 | 4.16 | 3.63 | 3.61 | 3.42 |

|  | Example 11 | Example 12 | Example 13 | Example 14 | Example 15 |
|---|---|---|---|---|---|
| Organic polymer resin | PES | PES | PES | PES | PES |
| Water-soluble polymer | — | — | — | — | — |
| Inorganic ion adsorbent raw material | Sulfate | Sulfate | Sulfate | Sulfate | Sulfate |
| Inorganic ion adsorbent | C | C | C | C | C |
| Replacement rate with ethanol in inorganic ion adsorbent (% by mass) | 95 | 95 | 95 | 95 | 95 |
| Supported amount of inorganic ion adsorbent (% by mass) | 43 | 33 | 31 | 79 | 79 |
| Sum total of pore volumes per unit mass of inorganic ion adsorbent measured by nitrogen gas adsorption method (cm³/g) | 0.36 | 0.34 | 0.35 | 0.34 | 0.36 |
| Pulverization method of inorganic ion exchanger | Jet mill | Jet mill | Jet mill | Jet mill | Jet mill |
| Average particle diameter of inorganic ion adsorbent (μm) | 1.03 | 1.03 | 1.03 | 1.03 | 1.03 |
| Ratio of (maximum particle diameter)/(minimum particle diameter) of inorganic ion adsorbent | 67 | 67 | 67 | 67 | 67 |
| Viscosity of stock liquid (mPa · s) | 1247 | 1032 | 828 | 1999 | 2084 |
| Granulation by rotating nozzle method | Possible | Possible | Possible | Possible | Possible |
| Solidification tank temperature (° C.) | 60 | 60 | 60 | 60 | 60 |
| NMP concentration in solidification tank (% by mass) | 50 | 50 | 50 | 50 | 50 |
| Concentration of surfactant added to solidification tank (mg/L) | 0 | 0 | 0 | 0 | 0 |

TABLE 1-continued

|  | | | | | |
|---|---|---|---|---|---|
| Nozzle diameter (mm) | 4 | 4 | 4 | 3.5 | 3 |
| Average particle diameter of porous shaped body (μm) | 546 | 543 | 533 | 450 | 352 |
| Pore volume of porous shaped body measured by nitrogen gas adsorption method (cm$^3$/g) | 0.15 | 0.11 | 0.11 | 0.27 | 0.28 |
| Specific surface area of porous shaped body measured by nitrogen gas adsorption method (m$^2$/g) | 205 | 195 | 189 | 217 | 198 |
| Flatness ratio of porous shaped body | 0.29 | 0.30 | 0.41 | 0.11 | 0.06 |
| Bulk density of porous shaped body (g/mL-porous shaped body) | 0.29 | 0.28 | 0.24 | 0.50 | 0.49 |
| Pore volume measured by mercury intrusion method (cm$^3$/g) | 1.42 | 1.51 | 1.55 | 1.03 | 1.19 |
| Modal pore diameter measured by mercury intrusion method (μm) | 0.23 | 0.26 | 0.19 | 0.19 | 0.18 |
| Elastic modulus of porous shaped body (mN/m$^2$) | 2487 | 2111 | 1722 | 6003 | 5244 |
| Abrasion rate of porous shaped body (% by mass) | 0.00 | 0.00 | 0.00 | 0.02 | 0.01 |
| Sodium hydroxide concentration at the time of washing (% by mass) | 0.4 | 0.4 | 0.4 | 0.4 | 0.4 |
| Sodium hydroxide feed amount at the time of washing (times) | 10 | 10 | 10 | 10 | 10 |
| Sodium hydroxide flow rate at the time of washing (h$^{-1}$) | 10 | 10 | 10 | 10 | 10 |
| Pure water feed amount at the time of washing (times) | 300 | 300 | 300 | 300 | 300 |
| Pure water feed rate at the time of washing (h$^{-1}$) | 80 | 80 | 80 | 80 | 80 |
| Leached anion concentration (mg/L) | 0.1 | 0.0 | 0.0 | 0.3 | 0.0 |
| UV absorbance | 0.00 | 0.00 | 0.00 | 0.02 | 0.00 |
| Leached metal ion concentration (mg/L) | <0.0001 | <0.0001 | <0.0001 | 0.0005 | <0.0001 |
| pH | 6.0 | 6.0 | 6.2 | 6.3 | 6.2 |
| pH change amount | 0.1 | 0.1 | 0.3 | 0.4 | 0.2 |
| Pressure loss at LV 20 m/hr (kPa/m) | 46 | 49 | 59 | 38 | 47 |
| Phosphorus adsorption amount (g-P/L- porous shaped body), SV120 h$^{-1}$ | 2.68 | 2.38 | 1.99 | 4.01 | 4.17 |
| Phosphorus adsorption amount (g-P/L- porous shaped body), SV240 h$^{-1}$ | 3.11 | 2.85 | 2.43 | 4.41 | 4.59 |

|  | Example 16 | Example 17 | Example 18 | Example 19 | Example 20 |
|---|---|---|---|---|---|
| Organic polymer resin | PES | PES | PES | PES | PES |
| Water-soluble polymer | — | — | — | — | — |
| Inorganic ion adsorbent raw material | Sulfate | Sulfate | Sulfate | Sulfate | Sulfate |
| Inorganic ion adsorbent | C | C | C | C | C |
| Replacement rate with ethanol in inorganic ion adsorbent (% by mass) | 95 | 95 | 95 | 95 | 95 |
| Supported amount of inorganic ion adsorbent (% by mass) | 79 | 79 | 79 | 79 | 79 |
| Sum total of pore volumes per unit mass of inorganic ion adsorbent measured by nitrogen gas adsorption method (cm3/g) | 0.36 | 0.36 | 0.36 | 0.36 | 0.34 |

TABLE 1-continued

| | | | | | |
|---|---|---|---|---|---|
| Pulverization method of inorganic ion exchanger | Jet mill | Jet mill | Jet mill | Jet mill | Jet mill |
| Average particle diameter of inorganic ion adsorbent (μm) | 1.03 | 1.03 | 1.03 | 1.03 | 1.03 |
| Ratio of (maximum particle diameter)/(minimum particle diameter) of inorganic ion adsorbent | 67 | 67 | 67 | 67 | 67 |
| Viscosity of stock liquid (mPa·s) | 1898 | 1902 | 1952 | 1970 | 1122 |
| Granulation by rotating nozzle method | Possible | Possible | Possible | Possible | Possible |
| Solidification tank temperature (°C.) | 60 | 60 | 60 | 80 | 60 |
| NMP concentration in solidification tank (% by mass) | 50 | 50 | 60 | 50 | 50 |
| Concentration of surfactant added to solidification tank (mg/L) | 0 | 2000 | 0 | 0 | 0 |
| Nozzle diameter (mm) | 4.5 | 4 | 4 | 4 | 3.5 |
| Average particle diameter of porous shaped body (μm) | 672 | 542 | 544 | 540 | 448 |
| Pore volume of porous shaped body measured by nitrogen gas adsorption method (cm3/g) | 0.28 | 0.28 | 0.28 | 0.28 | 0.27 |
| Specific surface area of porous shaped body measured by nitrogen gas adsorption method (m2/g) | 212 | 220 | 212 | 215 | 222 |
| Flatness ratio of porous shaped body | 0.28 | 0.05 | 0.04 | 0.04 | 0.52 |
| Bulk density of porous shaped body (g/mL-porous shaped body) | 0.47 | 0.50 | 0.51 | 0.51 | 0.41 |
| Pore volume measured by mercury intrusion method (cm3/g) | 1.11 | 1.13 | 1.08 | 1.21 | 0.97 |
| Modal pore diameter measured by mercury intrusion method (μm) | 0.16 | 0.22 | 0.35 | 0.32 | 0.22 |
| Elastic modulus of porous shaped body (mN/m2) | 5181 | 5790 | 5736 | 5783 | 4888 |
| Abrasion rate of porous shaped body (% by mass) | 0.03 | 0.00 | 0.01 | 0.00 | 0.13 |
| Sodium hydroxide concentration at the time of washing (% by mass) | 0.4 | 0.4 | 0.4 | 0.4 | 0.4 |
| Sodium hydroxide feed amount at the time of washing (times) | 10 | 10 | 10 | 10 | 10 |
| Sodium hydroxide flow rate at the time of washing (h−1) | 10 | 10 | 10 | 10 | 10 |
| Pure water feed amount at the time of washing (times) | 300 | 300 | 300 | 300 | 300 |
| Pure water feed rate at the time of washing (h−1) | 80 | 80 | 80 | 80 | 80 |
| Leached anion concentration (mg/L) | 0.1 | 0.0 | 0.1 | 0.0 | 1.0 |
| UV absorbance | 0.00 | 0.00 | 0.00 | 0.00 | 0.07 |
| Leached metal ion concentration (mg/L) | <0.0001 | <0.0001 | <0.0001 | <0.0001 | 0.0017 |
| pH | 5.9 | 6.2 | 6.0 | 5.9 | 6.2 |
| pH change amount | 0.1 | 0.4 | 0.1 | 0.0 | 0.3 |
| Pressure loss at LV 20 m/hr (kPa/m) | 39 | 20 | 21 | 21 | 68 |
| Phosphorus adsorption amount (g-P/L- porous shaped body), SV120 h-1 | 2.74 | 3.62 | 3.59 | 3.60 | 4.01 |
| Phosphorus adsorption amount (g-P/L- porous shaped body), SV240 h-1 | 3.03 | 3.99 | 3.90 | 3.94 | 4.53 |

TABLE 1-continued

| | Example 21 | Example 22 | Example 23 | Example 24 | Example 25 |
|---|---|---|---|---|---|
| Organic polymer resin | PES | PES | PES | PES | PES |
| Water-soluble polymer | — | — | — | — | — |
| Inorganic ion adsorbent raw material | Sulfate | Sulfate | Sulfate | Sulfate | Sulfate |
| Inorganic ion adsorbent | C | C | C | C | C |
| Replacement rate with ethanol in inorganic ion adsorbent (% by mass) | 95 | 95 | 95 | 95 | 95 |
| Supported amount of inorganic ion adsorbent (% by mass) | 79 | 79 | 79 | 79 | 79 |
| Sum total of pore volumes per unit mass of inorganic ion adsorbent measured by nitrogen gas adsorption method ($cm^3/g$) | 0.33 | 0.33 | 0.33 | 0.34 | 0.36 |
| Pulverization method of inorganic ion exchanger | Jet mill | Jet mill | Jet mill | Jet mill | Jet mill |
| Average particle diameter of inorganic ion adsorbent (μm) | 1.03 | 1.03 | 1.03 | 1.03 | 1.03 |
| Ratio of (maximum particle diameter)/(minimum particle diameter) of inorganic ion adsorbent | 67 | 67 | 67 | 67 | 67 |
| Viscosity of stock liquid (mPa·s) | 2100 | 1934 | 1987 | 1901 | 1977 |
| Granulation by rotating nozzle method | Possible | Possible | Possible | Possible | Possible |
| Solidification tank temperature (°C.) | 60 | 25 | 25 | 60 | 60 |
| NMP concentration in solidification tank (% by mass) | 0 | 50 | 0 | 50 | 50 |
| Concentration of surfactant added to solidification tank (mg/L) | 0 | 0 | 0 | 0 | 0 |
| Nozzle diameter (mm) | 4 | 4 | 4 | 2.5 | 5 |
| Average particle diameter of porous shaped body (μm) | 552 | 522 | 557 | 257 | 806 |
| Pore volume of porous shaped body measured by nitrogen gas adsorption method ($cm^3/g$) | 0.26 | 0.26 | 0.26 | 0.27 | 0.28 |
| Specific surface area of porous shaped body measured by nitrogen gas adsorption method ($m^2/g$) | 221 | 218 | 207 | 195 | 192 |
| Flatness ratio of porous shaped body | 0.55 | 0.41 | 0.67 | 0.09 | 0.13 |
| Bulk density of porous shaped body (g/mL-porous shaped body) | 0.50 | 0.52 | 0.51 | 0.49 | 0.49 |
| Pore volume measured by mercury intrusion method ($cm^3/g$) | 1.02 | 0.96 | 0.79 | 1.07 | 1.08 |
| Modal pore diameter measured by mercury intrusion method (μm) | 0.12 | 0.08 | 0.09 | 0.12 | 0.11 |
| Elastic modulus of porous shaped body ($mN/m^2$) | 6776 | 7598 | 7322 | 6021 | 6053 |
| Abrasion rate of porous shaped body (% by mass) | 0.09 | 0.11 | 0.21 | 0.00 | 0.01 |
| Sodium hydroxide concentration at the time of washing (% by mass) | 0.4 | 0.4 | 0.4 | 0.4 | 0.4 |
| Sodium hydroxide feed amount at the time of washing (times) | 10 | 10 | 10 | 10 | 10 |
| Sodium hydroxide flow rate at the time of washing ($h^{-1}$) | 10 | 10 | 10 | 10 | 10 |
| Pure water feed amount at the time of washing (times) | 300 | 300 | 300 | 300 | 300 |
| Pure water feed rate at the time of washing ($h^{-1}$) | 80 | 80 | 80 | 80 | 80 |
| Leached anion concentration (mg/L) | 0.1 | 0.2 | 1.6 | 0.1 | 0.1 |
| UV absorbance | 0.14 | 0.05 | 0.11 | 0.00 | 0.00 |
| Leached metal ion concentration (mg/L) | <0.0001 | 0.0009 | 0.010 | <0.0001 | <0.0001 |
| pH | 6.6 | 6.8 | 6.9 | 6.3 | 6.5 |

TABLE 1-continued

|  | | | | | |
|---|---|---|---|---|---|
| pH change amount | 0.6 | 0.9 | 0.8 | 0.3 | 0.6 |
| Pressure loss at LV 20 m/hr (kPa/m) | 52 | 55 | 69 | 136 | 14 |
| Phosphorus adsorption amount (g-P/L- porous shaped body), SV120 $h^{-1}$ | 3.31 | 3.5 | 3.97 | 4.31 | 1.84 |
| Phosphorus adsorption amount (g-P/L- porous shaped body), SV240 $h^{-1}$ | 3.74 | 3.87 | 4.48 | 4.71 | 2.02 |

|  | Example 26 | Example 27 | Example 28 | Example 29 | Example 30 |
|---|---|---|---|---|---|
| Organic polymer resin | PES | PES | PES | PES | PES |
| Water-soluble polymer | — | — | — | — | — |
| Inorganic ion adsorbent raw material | Sulfate | Sulfate | Sulfate | Sulfate | Sulfate |
| Inorganic ion adsorbent | C | C | C | C | C |
| Replacement rate with ethanol in inorganic ion adsorbent (% by mass) | 95 | 95 | 95 | 95 | 95 |
| Supported amount of inorganic ion adsorbent (% by mass) | 50 | 50 | 50 | 50 | 50 |
| Sum total of pore volumes per unit mass of inorganic ion adsorbent measured by nitrogen gas adsorption method ($cm^3/g$) | 0.33 | 0.35 | 0.35 | 0.36 | 0.35 |
| Pulverization method of inorganic ion exchanger | Jet mill | Jet mill | Jet mill | Jet mill | Jet mill |
| Average particle diameter of inorganic ion adsorbent (μm) | 1.03 | 1.03 | 1.03 | 1.03 | 1.03 |
| Ratio of (maximum particle diameter)/(minimum particle diameter) of inorganic ion adsorbent | 67 | 67 | 67 | 67 | 67 |
| Viscosity of stock liquid (mPa · s) | 1528 | 1509 | 2132 | 2773 | 1505 |
| Granulation by rotating nozzle method | Possible | Possible | Possible | Possible | Possible |
| Solidification tank temperature (° C.) | 80 | 80 | 60 | 60 | 60 |
| NMP concentration in solidification tank (% by mass) | 50 | 60 | 50 | 50 | 0 |
| Concentration of surfactant added to solidification tank (mg/L) | 0 | 0 | 0 | 0 | 0 |
| Nozzle diameter (mm) | 4 | 4 | 4 | 4 | 4 |
| Average particle diameter of porous shaped body (μm) | 540 | 538 | 536 | 549 | 548 |
| Pore volume of porous shaped body measured by nitrogen gas adsorption method ($cm^3/g$) | 0.17 | 0.18 | 0.18 | 0.18 | 0.18 |
| Specific surface area of porous shaped body measured by nitrogen gas adsorption method ($m^2/g$) | 209 | 197 | 175 | 184 | 190 |
| Flatness ratio of porous shaped body | 0.24 | 0.27 | 0.09 | 0.06 | 0.25 |
| Bulk density of porous shaped body (g/mL-porous shaped body) | 0.32 | 0.34 | 0.36 | 0.41 | 0.34 |
| Pore volume measured by mercury intrusion method ($cm^3/g$) | 1.28 | 1.22 | 0.59 | 0.50 | 1.25 |
| Modal pore diameter measured by mercury intrusion method (μm) | 0.37 | 0.45 | 0.14 | 0.12 | 0.13 |
| Elastic modulus of porous shaped body ($mN/m^2$) | 3768 | 3522 | 4460 | 4871 | 3034 |
| Abrasion rate of porous shaped body (% by mass) | 0.00 | 0.00 | 0.17 | 0.19 | 0.00 |
| Sodium hydroxide concentration at the time of washing (% by mass) | 0.4 | 0.4 | 0.4 | 0.4 | 0.4 |
| Sodium hydroxide feed amount at the time of washing (times) | 10 | 10 | 10 | 10 | 10 |
| Sodium hydroxide flow rate at the time of washing ($h^{-1}$) | 10 | 10 | 10 | 10 | 10 |

TABLE 1-continued

| | | | | | |
|---|---|---|---|---|---|
| Pure water feed amount at the time of washing (times) | 300 | 300 | 300 | 300 | 300 |
| Pure water feed rate at the time of washing ($h^{-1}$) | 80 | 80 | 80 | 80 | 80 |
| Leached anion concentration (mg/L) | 0.1 | 0.0 | 0.7 | 0.4 | 0.2 |
| UV absorbance | 0.00 | 0.00 | 0.07 | 0.04 | 0.00 |
| Leached metal ion concentration (mg/L) | <0.0001 | <0.0001 | 0.0070 | 0.0068 | <0.0001 |
| pH | 6.1 | 6.1 | 6.3 | 6.4 | 6.8 |
| pH change amount | 0.2 | 0.3 | 0.3 | 0.5 | 0.8 |
| Pressure loss at LV 20 m/hr (kPa/m) | 40 | 45 | 20 | 19 | 39 |
| Phosphorus adsorption amount (g-P/L- porous shaped body), SV120 $h^{-1}$ | 3.09 | 3.46 | 3.52 | 3.67 | 2.89 |
| Phosphorus adsorption amount (g-P/L- porous shaped body), SV240 $h^{-1}$ | 3.49 | 3.91 | 3.86 | 3.97 | 3.25 |

| | Example 31 | Example 32 | Example 33 | Example 34 | Example 35 |
|---|---|---|---|---|---|
| Organic polymer resin | PES | PES | PES | PES | PES |
| Water-soluble polymer | — | — | — | — | — |
| Inorganic ion adsorbent raw material | Sulfate | Sulfate | Sulfate | Sulfate | Sulfate |
| Inorganic ion adsorbent | C | C | C | C | C |
| Replacement rate with ethanol in inorganic ion adsorbent (% by mass) | 95 | 95 | 95 | 95 | 95 |
| Supported amount of inorganic ion adsorbent (% by mass) | 50 | 79 | 79 | 79 | 79 |
| Sum total of pore volumes per unit mass of inorganic ion adsorbent measured by nitrogen gas adsorption method ($cm^3/g$) | 0.34 | 0.35 | 0.37 | 0.35 | 0.35 |
| Pulverization method of inorganic ion exchanger | Jet mill | Jet mill | Jet mill | Jet mill | Ball mill |
| Average particle diameter of inorganic ion adsorbent (μm) | 1.03 | 3.40 | 6.33 | 0.30 | 3.51 |
| Ratio of (maximum particle diameter)/(minimum particle diameter) of inorganic ion adsorbent | 67 | 265 | 439 | 50 | 295 |
| Viscosity of stock liquid (mPa·s) | 1558 | 1463 | 978 | 5680 | 1234 |
| Granulation by rotating nozzle method | Possible | Possible | Possible | Possible | Possible |
| Solidification tank temperature (°C.) | 25 | 60 | 60 | 60 | 60 |
| NMP concentration in solidification tank (% by mass) | 0 | 50 | 50 | 50 | 50 |
| Concentration of surfactant added to solidification tank (mg/L) | 0 | 0 | 0 | 0 | 0 |
| Nozzle diameter (mm) | 4 | 4 | 4 | 4 | 4 |
| Average particle diameter of porous shaped body (μm) | 547 | 539 | 535 | 548 | 545 |
| Pore volume of porous shaped body measured by nitrogen gas adsorption method ($cm^3/g$) | 0.17 | 0.28 | 0.29 | 0.28 | 0.28 |
| Specific surface area of porous shaped body measured by nitrogen gas adsorption method ($m^2/g$) | 182 | 224 | 221 | 216 | 220 |
| Flatness ratio of porous shaped body | 0.20 | 0.27 | 0.39 | 0.01 | 0.23 |
| Bulk density of porous shaped body (g/mL-porous shaped body) | 0.33 | 0.50 | 0.51 | 0.49 | 0.50 |
| Pore volume measured by mercury intrusion method ($cm^3/g$) | 1.30 | 1.03 | 1.06 | 1.05 | 1.05 |
| Modal pore diameter measured by mercury intrusion method (μm) | 0.10 | 0.14 | 0.14 | 0.15 | 0.17 |

TABLE 1-continued

|  |  |  |  |  |  |
|---|---|---|---|---|---|
| Elastic modulus of porous shaped body (mN/m²) | 3708 | 6872 | 6171 | 6270 | 6713 |
| Abrasion rate of porous shaped body (% by mass) | 0.00 | 0.01 | 0.02 | 0.03 | 0.02 |
| Sodium hydroxide concentration at the time of washing (% by mass) | 0.4 | 0.4 | 0.4 | 0.4 | 0.4 |
| Sodium hydroxide feed amount at the time of washing (times) | 10 | 10 | 10 | 10 | 10 |
| Sodium hydroxide flow rate at the time of washing (h⁻¹) | 10 | 10 | 10 | 10 | 10 |
| Pure water feed amount at the time of washing (times) | 300 | 300 | 300 | 300 | 300 |
| Pure water feed rate at the time of washing (h⁻¹) | 80 | 80 | 80 | 80 | 80 |
| Leached anion concentration (mg/L) | 0.3 | 0.0 | 0.1 | 0.2 | 0.1 |
| UV absorbance | 0.00 | 0.00 | 0.00 | 0.02 | 0.00 |
| Leached metal ion concentration (mg/L) | <0.0001 | <0.0001 | <0.0001 | 0.0008 | <0.0001 |
| pH | 6.7 | 6.3 | 6.4 | 6.8 | 6.5 |
| pH change amount | 0.8 | 0.5 | 0.4 | 0.8 | 0.7 |
| Pressure loss at LV 20 m/hr (kPa/m) | 40 | 41 | 52 | 15 | 33 |
| Phosphorus adsorption amount (g-P/L- porous shaped body), SV120 h⁻¹ | 2.64 | 3.23 | 2.97 | 3.98 | 3.15 |
| Phosphorus adsorption amount (g-P/L- porous shaped body), SV240 h⁻¹ | 2.96 | 3.65 | 3.33 | 4.38 | 3.61 |

|  | Example 36 | Example 37 | Example 38 | Example 39 | Example 40 |
|---|---|---|---|---|---|
| Organic polymer resin | PES | PES | PES | PES | PES |
| Water-soluble polymer | — | — | — | — | — |
| Inorganic ion adsorbent raw material | Sulfate | Sulfate | Sulfate | Sulfate | Chloride |
| Inorganic ion adsorbent | C | C | C | C | C |
| Replacement rate with ethanol in inorganic ion adsorbent (% by mass) | 95 | 95 | 95 | 95 | 95 |
| Supported amount of inorganic ion adsorbent (% by mass) | 79 | 79 | 79 | 79 | 79 |
| Sum total of pore volumes per unit mass of inorganic ion adsorbent measured by nitrogen gas adsorption method (cm³/g) | 0.36 | 0.34 | 0.34 | 0.34 | 0.32 |
| Pulverization method of inorganic ion exchanger | Mortar | Ball mill | Jet mill | Jet mill | Jet mill |
| Average particle diameter of inorganic ion adsorbent (μm) | 32.5 | 20.0 | 1.03 | 1.03 | 1.03 |
| Ratio of (maximum particle diameter)/(minimum particle diameter) of inorganic ion adsorbent | 387 | 513 | 67 | 67 | 67 |
| Viscosity of stock liquid (mPa·s) | 350 | 499 | 2228 | 2210 | 2160 |
| Granulation by rotating nozzle method | Possible | Possible | Possible | Possible | Possible |
| Solidification tank temperature (°C) | 60 | 60 | 60 | 60 | 60 |
| NMP concentration in solidification tank (% by mass) | 50 | 50 | 50 | 50 | 50 |
| Concentration of surfactant added to solidification tank (mg/L) | 0 | 0 | 0 | 0 | 0 |
| Nozzle diameter (mm) | 4 | 4 | 4 | 4 | 4 |
| Average particle diameter of porous shaped body (μm) | 540 | 545 | 545 | 545 | 542 |
| Pore volume of porous shaped body measured by nitrogen gas adsorption method (cm³/g) | 0.28 | 0.27 | 0.27 | 0.27 | 0.25 |
| Specific surface area of porous shaped body measured by nitrogen gas adsorption method (m²/g) | 224 | 224 | 224 | 224 | 216 |
| Flatness ratio of porous shaped body | 0.55 | 0.45 | 0.18 | 0.16 | 0.11 |

TABLE 1-continued

| | | | | | |
|---|---|---|---|---|---|
| Bulk density of porous shaped body (g/mL-porous shaped body) | 0.47 | 0.49 | 0.51 | 0.51 | 0.49 |
| Pore volume measured by mercury intrusion method (cm$^3$/g) | 1.09 | 1.12 | 1.02 | 1.00 | 1.06 |
| Modal pore diameter measured by mercury intrusion method (μm) | 0.18 | 0.19 | 0.16 | 0.18 | 0.16 |
| Elastic modulus of porous shaped body (mN/m$^2$) | 6080 | 6805 | 6912 | 6124 | 6660 |
| Abrasion rate of porous shaped body (% by mass) | 0.01 | 0.01 | 0.02 | 0.02 | 0.01 |
| Sodium hydroxide concentration at the time of washing (% by mass) | 0.4 | 0.4 | 1.0 | 0.1 | 0.4 |
| Sodium hydroxide feed amount at the time of washing (times) | 10 | 10 | 10 | 10 | 10 |
| Sodium hydroxide flow rate at the time of washing (h$^{-1}$) | 10 | 10 | 10 | 10 | 10 |
| Pure water feed amount at the time of washing (times) | 300 | 300 | 300 | 300 | 300 |
| Pure water feed rate at the time of washing (h$^{-1}$) | 80 | 80 | 80 | 80 | 80 |
| Leached anion concentration (mg/L) | 0.0 | 0.0 | 0.0 | 1.4 | 0.5 |
| UV absorbance | 0.00 | 0.00 | 0.00 | 0.15 | 0.02 |
| Leached metal ion concentration (mg/L) | <0.0001 | <0.0001 | <0.0001 | 0.0014 | 0.0020 |
| pH | 6.1 | 6.7 | 6.3 | 5.3 | 5.7 |
| pH change amount | 0.2 | 0.8 | 0.4 | 0.5 | 0.1 |
| Pressure loss at LV 20 m/hr (kPa/m) | 61 | 66 | 26 | 24 | 20 |
| Phosphorus adsorption amount (g-P/L- porous shaped body), SV120 h$^{-1}$ | 1.80 | 1.86 | 3.71 | 3.79 | 3.55 |
| Phosphorus adsorption amount (g-P/L- porous shaped body), SV240 h$^{-1}$ | 1.92 | 2.01 | 4.39 | 4.21 | 4.00 |

| | Example 41 | Example 42 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Organic polymer resin | PES | PES | PES | PES | PES | PES | PES | PES | PES |
| Water-soluble polymer | — | — | — | — | — | — | — | — | — |
| Inorganic ion adsorbent raw material | Sulfate | Sulfate | Sulfate | Sulfate | Sulfate | — | Sulfate | Sulfate | Sulfate |
| Inorganic ion adsorbent | C | C | C | C | C | — | C | C | C |
| Replacement rate with ethanol in inorganic ion adsorbent (% by mass) | 95 | 95 | 14 | 0 | 0 | — | 95 | 95 | 14 |
| Supported amount of inorganic ion adsorbent (% by mass) | 79 | 79 | 79 | 79 | 93 | 0 | — | — | 79 |
| Sum total of pore volumes per unit mass of inorganic ion adsorbent measured by nitrogen gas adsorption method (cm$^3$/g) | 0.34 | 0.34 | 0.02 | 0.01 | 0.01 | — | — | — | 0.02 |
| Pulverization method of inorganic ion exchanger | Jet mill | Jet mill | Jet mill | Jet mill | Jet mill | — | Jet mill | Jet mill | Jet mill |
| Average particle diameter of inorganic ion adsorbent (μm) | 1.03 | 1.03 | 1.01 | 1.00 | 1.00 | — | 0.06 | 0.05 | 1.01 |
| Ratio of (maximum particle diameter)/(minimum particle diameter) of inorganic ion adsorbent | 67 | 67 | 107 | 107 | 107 | — | 125 | 1087 | 107 |
| Viscosity of stock liquid (mPa · s) | 2046 | 2088 | 2040 | 1823 | 3562 | 624 | 35000 | 200000 | 2009 |
| Granulation by rotating nozzle method | Possible | Possible | Possible | Possible | Possible | Possible | Impossible | Impossible | Possible |
| Solidification tank temperature (° C.) | 60 | 60 | 60 | 60 | 60 | 60 | 60 | 60 | 60 |
| NMP concentration in solidification tank (% by mass) | 50 | 50 | 50 | 50 | 50 | 50 | 50 | 50 | 50 |
| Concentration of surfactant added to solidification tank (mg/L) | 0 | 0 | 0 | 0 | 0 | 0 | 0 | 0 | 0 |

TABLE 1-continued

| | | | | | | | | | |
|---|---|---|---|---|---|---|---|---|---|
| Nozzle diameter (mm) | 4 | 4 | 4 | 4 | 4 | 4 | 4 | 4 | 4 |
| Average particle diameter of porous shaped body (μm) | 545 | 545 | 540 | 541 | 537 | 540 | — | — | 540 |
| Pore volume of porous shaped body measured by nitrogen gas adsorption method (cm³/g) | 0.27 | 0.27 | 0.01 | 0.01 | 0.01 | 0.01 | — | — | 0.01 |
| Specific surface area of porous shaped body measured by nitrogen gas adsorption method (m²/g) | 224 | 224 | 49 | 37 | 44 | 15 | — | — | 49 |
| Flatness ratio of porous shaped body | 0.10 | 0.15 | 0.13 | 0.15 | 0.02 | 0.25 | — | — | 0.16 |
| Bulk density of porous shaped body (g/mL-porous shaped body) | 0.51 | 0.51 | 0.47 | 0.49 | 0.67 | 0.21 | — | — | 0.47 |
| Pore volume measured by mercury intrusion method (cm³/g) | 1.07 | 1.03 | 0.81 | 0.72 | 0.58 | 1.42 | — | — | 0.81 |
| Modal pore diameter measured by mercury intrusion method (μm) | 0.19 | 0.18 | 0.15 | 0.14 | 0.14 | 0.17 | — | — | 0.15 |
| Elastic modulus of porous shaped body (mN/m²) | 6123 | 6908 | 7037 | 6912 | 11200 | 981 | — | — | 5225 |
| Abrasion rate of porous shaped body (% by mass) | 0.00 | 0.01 | 0.15 | 0.16 | 0.22 | 0.00 | — | — | 0.15 |
| Sodium hydroxide concentration at the time of washing (% by mass) | — | — | 0.4 | 0.4 | 0.4 | 0.4 | — | — | — |
| Sodium hydroxide feed amount at the time of washing (times) | — | — | 10 | 10 | 10 | 10 | — | — | — |
| Sodium hydroxide flow rate at the time of washing (h⁻¹) | — | — | 10 | 10 | 10 | 10 | — | — | — |
| Pure water feed amount at the time of washing (times) | 300 | — | 300 | 300 | 300 | 300 | — | — | 300 |
| Pure water feed rate at the time of washing (h⁻¹) | 80 | — | 80 | 80 | 80 | 80 | — | — | 80 |
| Leached anion concentration (mg/L) | 3.0 | 7.6 | 0.5 | 0.7 | 0.9 | 0.1 | — | — | 3.4 |
| UV absorbance | 0.44 | 0.98 | 0.06 | 0.09 | 0.13 | 0.00 | — | — | 0.48 |
| Leached metal ion concentration (mg/L) | 4.1 | 10 | 0.0087 | 0.010 | 0.021 | <0.0001 | — | — | 7.0 |
| pH | 4.3 | 4.0 | 6.5 | 6.1 | 5.9 | 6.3 | — | — | 4.2 |
| pH change amount | 1.6 | 1.7 | 0.5 | 0.2 | 0.0 | 0.2 | — | — | 1.6 |
| Pressure loss at LV 20 m/hr (kPa/m) | 21 | 27 | 28 | 22 | 18 | 40 | — | — | 42 |
| Phosphorus adsorption amount (g-P/L- porous shaped body), SV120 h⁻¹ | 3.75 | 3.81 | 1.52 | 1.31 | 1.54 | 0.00 | — | — | 1.58 |
| Phosphorus adsorption amount (g-P/L- porous shaped body), SV240 h⁻¹ | 4.25 | 4.30 | 1.73 | 1.44 | 1.79 | 0.00 | — | — | 1.71 |

C: Hydrated cerium oxide

From the results shown in Table 1 above, it has become clear that, as the replacement rate with an organic liquid becomes higher when an inorganic ion adsorbent is dried, the pore volume of a porous shaped body becomes larger, and a porous shaped body capable of adsorbing a large amount of phosphorus at an ultrahigh water flow rate (SV 120 hr⁻¹, or SV 240 hr⁻¹) can be obtained.

INDUSTRIAL APPLICABILITY

Since a porous shaped body according to the present invention can remove ions, particularly phosphate ions, in water to be treated even at an ultrahigh flow rate of SV 120 hr⁻¹, or SV 240 hr⁻¹, and has a large adsorption capacity, it is particularly suitable for removing a harmful substance in metal coating, pharmaceutical production, medical use, etc.

The invention claimed is:

1. A porous shaped body in which an organic polymer resin and an inorganic ion adsorbent are included, and the sum total of the volumes of pores having a pore diameter of from 1 nm to 80 nm measured by a nitrogen gas adsorption method is per unit mass of the inorganic ion adsorbent from 0.05 cm³/g to 0.7 cm³/g wherein the elastic modulus of the porous shaped body is from 1000 mN/m² to 12000 mN/m².

2. The porous shaped body according to claim 1, wherein the sum total of the volumes of pores having a pore diameter of from 1 nm to 80 nm measured by a nitrogen gas adsorption method is per unit mass of the porous shaped body from 0.02 cm³/g to 0.6 cm³/g.

3. The porous shaped body according to claim 1, wherein the specific surface area measured by a nitrogen gas adsorption method is from 50 m²/g to 400 m²/g.

4. The porous shaped body according to claim 1, wherein the supported amount of the inorganic ion adsorbent included in the porous shaped body is from 30% by mass to 95% by mass.

5. The porous shaped body according to claim 1 in a form of spherical particles with an average particle diameter of from 100 μm to 2500 μm.

6. The porous shaped body according to claim 1, wherein the flatness ratio of the porous shaped body particles is from 0 to 0.3.

7. The porous shaped body according to claim 1, wherein the bulk density of the porous shaped body is from 0.2 g/mL to 0.7 g/mL.

8. The porous shaped body according to claim 1, wherein the average particle diameter of an inorganic ion adsorbent included in the porous shaped body is from 0.08 µm to 10 µm, and the ratio of (maximum particle diameter)/(minimum particle diameter) of the inorganic ion adsorbent is from 1 to 500.

9. The porous shaped body according to claim 1, wherein the pore volume measured by a mercury intrusion method in a range of pore diameter of from 5.5 nm to 120 µm is from 0.6 to 2.0 cm³/g.

10. The porous shaped body according to claim 1, wherein the modal pore diameter measured by a mercury intrusion method is from 0.08 µm to 0.7 µm.

11. The porous shaped body according to claim 1, wherein the anion concentration in an aqueous solution prepared by immersing the porous shaped body in pure water in an amount 10 times the bulk volume of the same at 70° C. for 1 hour is less than 2.0 mg/L.

12. The porous shaped body according to claim 1, wherein the value of absorbance in a UV measurement of an aqueous solution prepared by immersing the porous shaped body in pure water in an amount 10 times the bulk volume of the same at 70° C. for 1 hour is less than 0.2.

13. The porous shaped body according to claim 1, wherein the metal ion concentration in an aqueous solution prepared by immersing the porous shaped body in pure water in an amount 10 times the bulk volume of the same at 70° C. for 1 hour is less than 1.0 mg/L.

14. The porous shaped body according to claim 1, wherein the pH of an aqueous solution prepared by immersing the porous shaped body in pure water in an amount 10 times the bulk volume of the same at 70° C. for 1 hour is 5 or more, and the amount of change in pH is from 0 to 1.5.

15. The porous shaped body according to claim 1, wherein the abrasion rate of the porous shaped body is from 0% to 0.1%.

16. The porous shaped body according to claim 1, wherein the inorganic ion adsorbent comprises at least one metal oxide represented by the following Formula (I):

$$MN_xO_n \cdot mH_2O \tag{I}$$

[wherein x is 0 to 3, n is 1 to 4, m is 0 to 6, and M and N are metal elements that are different from each other, and selected from the group consisting of Ti, Zr, Sn, Sc, Y, La, Ce, Pr, Nd, Sm, Eu, Gd, Tb, Dy, Ho, Er, Tm, Yb, Lu, Al, Si, Cr, Co, Ga, Fe, Mn, Ni, V, Ge, Nb, and Ta]; and/or at least one metal carbonate represented by the following Formula (III):

$$Q_yR_z(CO_3)_s \cdot tH_2O \tag{III}$$

[wherein y is 1 to 2, z is 0 to 1, s is 1 to 3, t is 0 to 8, and Q and R are metal elements that are different from each other, and selected from the group consisting of Mg, Ca, Sr, Ba, Sc, Mn, Fe, Co, Ni, Ag, Zn, Y, La, Ce, Pr, Nd, Sm, Eu, Gd, Tb, Dy, Ho, Er, Tm, Yb, and Lu].

17. The porous shaped body according to claim 16, wherein the metal oxide is selected from the following groups (a) to (c):
(a) hydrated titanium oxide, hydrated zirconium oxide, hydrated tin oxide, hydrated cerium oxide, hydrated lanthanum oxide, and hydrated yttrium oxide;
(b) a composite metal oxide between at least one metal element selected from the group consisting of titanium, zirconium, tin, cerium, lanthanum, and yttrium, and at least one metal element selected from the group consisting of aluminum, silicon, and iron; and
(c) activated alumina.

18. The porous shaped body according to claim 16, wherein the metal carbonate is selected from the following group (d):
(d) magnesium carbonate, calcium carbonate, strontium carbonate, barium carbonate, scandium carbonate, manganese carbonate, iron carbonate, cobalt carbonate, nickel carbonate, silver carbonate, zinc carbonate, yttrium carbonate, lanthanum carbonate, cerium carbonate, praseodymium carbonate, neodymium carbonate, samarium carbonate, europium carbonate, gadolinium carbonate, terbium carbonate, dysprosium carbonate, holmium carbonate, erbium carbonate, thulium carbonate, ytterbium carbonate, and lutetium carbonate.

19. The porous shaped body according to claim 1, wherein the organic polymer resin is at least one selected from the group consisting of an ethylene/vinyl alcohol copolymer (EVOH), polyacrylonitrile (PAN), polysulfone (PS), polyethersulfone (PES), poly(vinylidene fluoride) (PVDF), poly(methyl methacrylate) (PMMA), poly(aryl ether sulfone), polypropylene, polystyrene, polycarbonate, cellulose, and cellulose triacetate.

* * * * *